(12) United States Patent
Cheng et al.

(10) Patent No.: US 8,095,484 B2
(45) Date of Patent: Jan. 10, 2012

(54) SYSTEM AND METHOD FOR AUTOMATIC VIRTUAL METROLOGY

(75) Inventors: Fan-Tien Cheng, Tainan (TW);
Hsien-Cheng Huang, Taoyuan (TW);
Yi-Ting Huang, Zhongli (TW);
Jia-Mau Jian, Kaohsiung (TW)

(73) Assignee: National Cheng Kung University, Tainan (TW)

( * ) Notice: Subject to any disclaimer, the term of this patent is extended or adjusted under 35 U.S.C. 154(b) by 791 days.

(21) Appl. No.: 12/207,706

(22) Filed: Sep. 10, 2008

(65) Prior Publication Data

US 2009/0292386 A1    Nov. 26, 2009

(30) Foreign Application Priority Data

May 20, 2008  (TW) ................. 97118526 A

(51) Int. Cl.
  *G06F 15/18* (2006.01)
(52) U.S. Cl. .................................................. 706/14
(58) Field of Classification Search .................... None
  See application file for complete search history.

(56) References Cited

U.S. PATENT DOCUMENTS

| 7,067,333 B1 * | 6/2006 | Pasadyn et al. ............... 438/5 |
| 2008/0275586 A1 * | 11/2008 | Ko et al. ....................... 700/110 |

FOREIGN PATENT DOCUMENTS

| TW | I267012 | 11/2006 |
| TW | I269990 | 1/2007 |
| TW | 200742951 | 11/2007 |
| TW | 200745895 | 12/2007 |

OTHER PUBLICATIONS

English translation of abstract of TW 200745895.
English translation of abstract of TW I267012.
English translation of abstract of TW 200742951.
English translation of abstract of TW I269990.
Hsien-Cheng Huang, Yu-Chuan Su, Fan-Tien Cheng and Jia-Mau Jian; "Development of a Generic Virtual Metrology Framework"; Proceedings of the 3rd Annual IEEE Conference on Automation Science and Engineering; Sep. 22-25, 2007; pp. 282-287.
Fan-Tien Cheng, Hsien-Cheng Huang, and Chi-An Kao; "Development of a Dual Phase Virtual Metrology Scheme"; Proceedings of the 3rd Annual IEEE Conference on Automation Science and Engineering; Sep. 22-25, 2007; pp. 270-275.

* cited by examiner

*Primary Examiner* — Jeffrey A Gaffin
*Assistant Examiner* — Stanley K Hill
(74) *Attorney, Agent, or Firm* — Thomas, Kayden, Horstemeyer & Risley, LLP

(57) ABSTRACT

A server, a system and a method for automatic virtual metrology (AVM) are disclosed. The AVM system comprises a model-creation server and a plurality of AVM servers. The model-creation server is used to construct the first set of virtual metrology (VM) models (of a certain equipment type) including a VM conjecture model, a RI (Reliance Index) model, a GSI (Global Similarity Index) model, a $DQI_x$ (Process Data Quality Index) model, and a $DQI_y$ (Metrology Data Quality Index) model. In the AVM method, the model-creation server also can fan out or port the first set of VM models generated to other AVM servers of the same process apparatus (equipment) type, and each individual fan-out-acceptor's AVM server can perform automatic model refreshing processes so as to gain and maintain its VM models' accuracy.

20 Claims, 11 Drawing Sheets

SYSTEM AND METHOD FOR AUTOMATIC VIRTUAL METROLOGY

RELATED APPLICATIONS

This application claims priority to Taiwan Application Serial Number 97118526, filed May 20, 2008, which is herein incorporated by reference.

BACKGROUND

1. Field of Invention

The present invention relates to a system and a method for virtual metrology (VM). More particularly, the present invention relates to a system and a method for automatic virtual metrology (AVM) which can fan out or port a full set of VM models of a certain type of equipment to other equipment of the same type with ensuring VM accuracy.

2. Description of Related Art

In the semiconductor and TFT-LCD industries, to ensure process stability and improve yield rate of production equipment, it is necessary to conduct on-line quality monitoring on each workpiece (i.e. "wafer" in IC foundries or "glass" in TFT-LCD factories) processed on the production equipment. Virtual metrology is used to conjecture the quality of a workpiece fabricated by a piece of production equipment by using the process data collected from production equipment, when physical metrology is either impossible or unavailable to be conducted on the workpiece. When virtual metrology is applied, since the physical features of process chambers in the same equipment or the same type of equipment are not quite the same, the conjecture models of the respective process chambers have to be built in accordance with their own features, so as to maintain the conjecturing accuracy of virtual metrology. Hence, when it is desired to implement virtual metrology fab-wide, a conventional skill needs to construct a conjecture model for each process chamber (apparatus) of each equipment, and thus the amount of the prediction models in the whole plant is becoming enormous when the equipment types and numbers increase. When the conventional skill which needs to create individual models for the respective process chambers of each equipment is applied, a large amount of historical data has to be extracted for creating those models one by one, thus consuming a lot of manpower and cost, so that implementing virtual metrology on the whole plant becomes nearly impossible. Hence, there is a need to develop a system and a method for automatic virtual metrology (AVM) to overcome the aforementioned problems.

Further, the conventional skill does not have the capability of performing online and real time quality evaluation on the collected process data or actual metrology data. Therefore, if the collected process data or actual metrology data are abnormal, the conventional skill will still use the abnormal data to tune or re-train the virtual metrology models, thus affecting the conjecturing accuracy of virtual metrology. Moreover, in order to overcome the difficulty of automatically evaluating and sifting a large amount of data needed for implementing the virtual metrology on all the process apparatuses (such as process chambers) of each equipment of the whole plant, the conventional skill have to own the capability of automatically performing online and real-time data quality evaluation on the collected process data and actual metrology data, thereby automatically excluding abnormal process data and actual metrology data, thus saving a lot of manpower and time. Hence, there is also a need to develop data quality indexes having the capability of automatically evaluating and sifting data.

SUMMARY

One aspect of the present invention is to provide a server, a system and a method for automatic virtual metrology, thereby providing the techniques of automatically fanning-out or porting and refreshing a set of VM models to the respective chambers of the same or the same type of equipment, thus greatly reducing the time for implementing virtual metrology thereon and maintaining the desirable accuracy of the virtual metrology.

Another aspect of the present invention is to provide a server, a system and a method for automatic virtual metrology, thereby providing data quality evaluation indexes having the capabilities of automatically evaluating and sifting process data and actual metrology data (measurement values).

In accordance with the aforementioned aspects, a server, a system and a method for automatic virtual metrology (AVM) are provided. According to an embodiment of the present invention, the server for AVM (also called "AVM server") comprises a set of VM models, a control kernel with a dual-phase VM algorithm, a data pre-processing module, a pluggable driver interface (PDI), a data collection driver, a pluggable application interface (PAI) and a VM-models storage module.

The set of VM models comprises a conjecture model, a RI (Reliance Index) model, a GSI (Global Similarity Index) model, a $DQI_x$ (Process Data Quality Index) model and a $DQI_y$ (Metrology Data Quality Index) model. The conjecture model is used to generate a virtual metrology (VM) value of a workpiece, wherein the conjecture model is built in accordance with a conjecture algorithm, and the conjecture algorithm can be such as a neural network (NN) algorithm, a multi-regression (MR) algorithm, a support vector machines (SVM) algorithm or any other prediction algorithm. The RI model is used to generate a reliance index of the virtual metrology value, wherein the RI model is built in accordance with a reference algorithm, and the reference algorithm is different from the aforementioned conjecture algorithm and can be such as a multi-regression algorithm, a neural network algorithm, a SVM algorithm or any other prediction algorithm. The GSI model is used to compute a global similarity index for process data, wherein the GSI model is built in accordance with a Mahalanobis distance algorithm. The $DQI_x$ model is used to compute a process data quality index ($DQI_x$) for the process data used to build the VM models, wherein the $DQI_x$ model is built in accordance with a principal component analysis (PCA) and an Euclidean distance (ED) algorithm. The $DQI_y$ model is used to compute a metrology data quality index ($DQI_y$) for the actual metrology data used to build the VM models, wherein the $DQI_y$ model is built in accordance with adaptive resonance theory 2 (ART2) and normalized variability (NV).

The control kernel is used to monitor the states of respective modules in the AVM server, and control the operation procedure of each module in accordance with a dual-phase virtual metrology algorithm. The data pre-processing module is based on the $DQI_x$ model and the $DQI_y$ model to evaluate the quality of process data and actual metrology data. The data collection driver is connected to the PDI for collecting process data and actual metrology data (measurement values), wherein the collected process data and actual metrology data are provided to the data pre-processing module via the PDI. The VM-models storage module is connected to the PAI for storing the whole set of VM models.

In another embodiment, the aforementioned AVM server uses the newest set of process data and the newest actual measurement value to replace the oldest data in a plurality of sets of historical process data and a plurality of historical measurement values used for creating VM models, thereby retraining or tuning the VM models.

According to the embodiment of the present invention, the system for AVM (also called "AVM system") comprises at least one first process apparatus, a first metrology equipment, a first AVM server, a model-creation server, a second process apparatus, a second metrology equipment and a second AVM server. The first process apparatus has a plurality of sets of historical process data and a set of first process data, wherein the first process apparatus produces a first workpiece in accordance with the set of first process data. The first metrology equipment has a plurality of historical measurement values and is measuring or will measure a first actual measurement value of the first workpiece, wherein the historical measurement values are the actual metrology data of the workpieces respectively produced by using these sets of historical process data. The model-creation server is used for building the aforementioned VM models with the historical process data and the historical measurement values. The second process apparatus is used to produce a second workpiece in accordance with a set of second process data. The second metrology equipment is used to measure a second actual measurement value of the second workpiece. The second AVM server is used to conduct virtual metrology on the second workpiece with the VM models therein.

In the AVM system, the second AVM server uses the second process data and the second actual measurement value to replace the oldest data in the historical process data and the historical measurement value, thereby retraining or tuning the VM models in the second AVM server.

According to the embodiment of the present invention, in the method for AVM (also called "AVM method"), a model-creation step is first performed for building a set of first VM models by using a plurality of historical measurement values and a plurality of sets of historical process data corresponding to the historical measurement values, wherein the set of first VM models comprises a conjecture model, a RI model and a GSI model. Thereafter, a set of first process data of a certain workpiece is collected from a process apparatus. After the collection of the first process data of the certain workpiece from the process apparatus is completed, a phase-one VM step is promptly performed. In the phase-one VM step, a first-phase VM computation step is performed to compute a phase-one VM value ($VM_I$) of the certain workpiece and its accompanying RI and GSI by inputting the first process data to the first VM models. When a first actual measurement value of the certain workpiece is obtained, a phase-two VM step is performed, wherein the criteria of whether the production equipment has been idled for a predetermined period of time; and whether an instruction of manual activation or an instruction of model refreshing (it is set to "yes" when a model-refreshing procedure is desired) is true are used to determine if a retraining step should be performed. If no retraining step is needed, then only a tuning step is needed in the phase-two metrology step. In the retraining or tuning step, the first process data and the first actual measurement value are used to replace the oldest data in the historical process data and the historical measurement values so as to rebuild a set of second VM models, wherein the component types and their building methods are the same between the first VM models and the second VM models. Thereafter, the set of the second VM models is adopted to re-compute the phase-two VM values ($VM_{II}$) and their accompanying RIs and GSIs for all the workpieces in the cassette belonging to the certain workpiece. Then, the set of second VM models replaces the set of first VM models to compute phase-one VM values for the subsequent workpieces entering the process apparatus.

In the AVM method, the RI model includes a reference prediction model used for generating a reference prediction value of a workpiece. At first, in the aforementioned model-creation step, according to a cross validation's leave-one-out (LOO) method, one set of historical data (process data and measurement value) is selected from all the sets of historical data (used for establishing the set of first VM models) as a test sample set, and the remaining sets of historical data sets are used to construct a LOO conjecture model, a LOO reference prediction model and a LOO GSI model in the first VM models, and to obtain a VM conjecture error, a reference prediction error and a $GSI_{LOO}$ value of the test sample set. Then, the above steps are repeated with respect to each of the sets of historical data until all of the VM conjecture errors, reference prediction errors and $GSI_{LOO}$ values corresponding to the sets of historical data are acquired, and thus the maximum and minimum values of the VM conjecture errors, the maximum and minimum values of the reference prediction errors, and, for example, the 90% trimmed mean of the $GSI_{LOO}$ values can be obtained for computing a refreshing threshold of VM conjecture, a refreshing threshold of reference prediction and a refreshing threshold of GSI.

After the aforementioned model-creation step is completed, the complete set of first VM models (comprising a conjecture model, a reference prediction model in a RI model and a GSI model) and their corresponding refreshing thresholds can be ported or fanned out to another apparatus of the same type, and a refreshing procedure can be proceeded on a AVM server of the apparatus of the same type.

Regarding the model-refreshing procedure, at first in the phase-one VM step, the first process data of the certain workpiece is inputted to the conjecture model, the reference prediction model of the RI model, and the GSI model in the set of the first VM models, thereby computing a phase-one VM value, a phase-one reference prediction value and a phase-one GSI value. In the phase-two VM step, the first process data and the first actual measurement value of the certain workpiece are used to replace the oldest data in the historical process data and the historical measurement values. Thereafter, the new historical process data and historical measurement values are adopted to retrain or tune the set of second VM models. Then, the set of second VM models replaces the set of first VM models to compute the phase-one VM values for the subsequent workpieces entering the process apparatus. When the instruction of model refreshing is "yes", the certain workpiece and several consecutive workpieces entering the process apparatus before and/or after the certain workpiece are defined as a plurality of consecutive refreshing samples (for example: 3 consecutive refreshing samples). Thereafter, a first model-refreshing condition is defined as follows: the mean absolute percentage error (MAPE) values of the phase-one VM values of these consecutive refreshing samples are smaller than the refreshing threshold of VM conjecture; a second model-refreshing condition is defined as follows: the MAPE values of the phase-one reference prediction values of these consecutive refreshing samples are smaller than the refreshing threshold of reference prediction; and a third model-refreshing condition is defined as follows: the phase-one GSI values of these consecutive refreshing samples are smaller than the refreshing threshold of GSI. Then, a determination result is obtained by determining if all of the first, second and third model-refreshing conditions are met simultaneously, wherein the instruction of model refreshing will be set to "no" if the determination result is true ("yes"), otherwise the instruction of model refreshing will remain as "yes".

In the AVM method, the aforementioned first VM models further comprises a $DQI_x$ model and a $DQI_y$ model. In the aforementioned model-creation step, a first process data quality threshold ($DQI_{x_T}$) is computed by using the historical process data and by applying the cross validation's leave-one-out (LOO) method to the $DQI_x$ model of the first VM models; and a first metrology data quality threshold ($DQI_{y_T}$) is computed by applying the concept of maximal-tolerable variance to the $DQI_y$ model of the first VM models. Then, in the aforementioned phase-one VM step, prior to the phase-one VM computation step, the process data of a workpiece from the process apparatus is first inputted into the $DQI_x$ model of the first VM models so as to compute a first $DQI_x$ value of the workpiece. Thereafter, a first checking result is obtained by checking if the first $DQI_x$ value is greater than the first $DQI_{x_T}$, wherein when the first checking result is true ("yes"), a warning and a request of data analysis are issued and then the phase-one VM computation step is performed. Thereafter, in the phase-two VM step, the actual measurement value of the workpiece is first inputted to the $DQI_y$ model of the first VM models so as to compute a first $DQI_y$ value of the workpiece, and then a second checking result is obtained by checking if the first $DQI_y$ value is greater than the first $DQI_{y_T}$, wherein when the second checking result is true ("yes"), a warning and a request of data analysis are issued and also the phase-two VM step is ended; and, when the second checking result is false ("no"), then the retraining or tuning step will be performed.

Hence, with the application of the embodiments of the present invention, the time and effort for introducing virtual metrology into each process chamber of the same equipment or the same type of equipment can be greatly saved with maintaining the desirable accuracy of the virtual metrology; and the process data and actual metrology data (measurement values) can be automatically evaluated and sifted, thus satisfying the requirements of introducing virtual metrology into the whole plant.

It is to be understood that both the foregoing general description and the following detailed description are examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
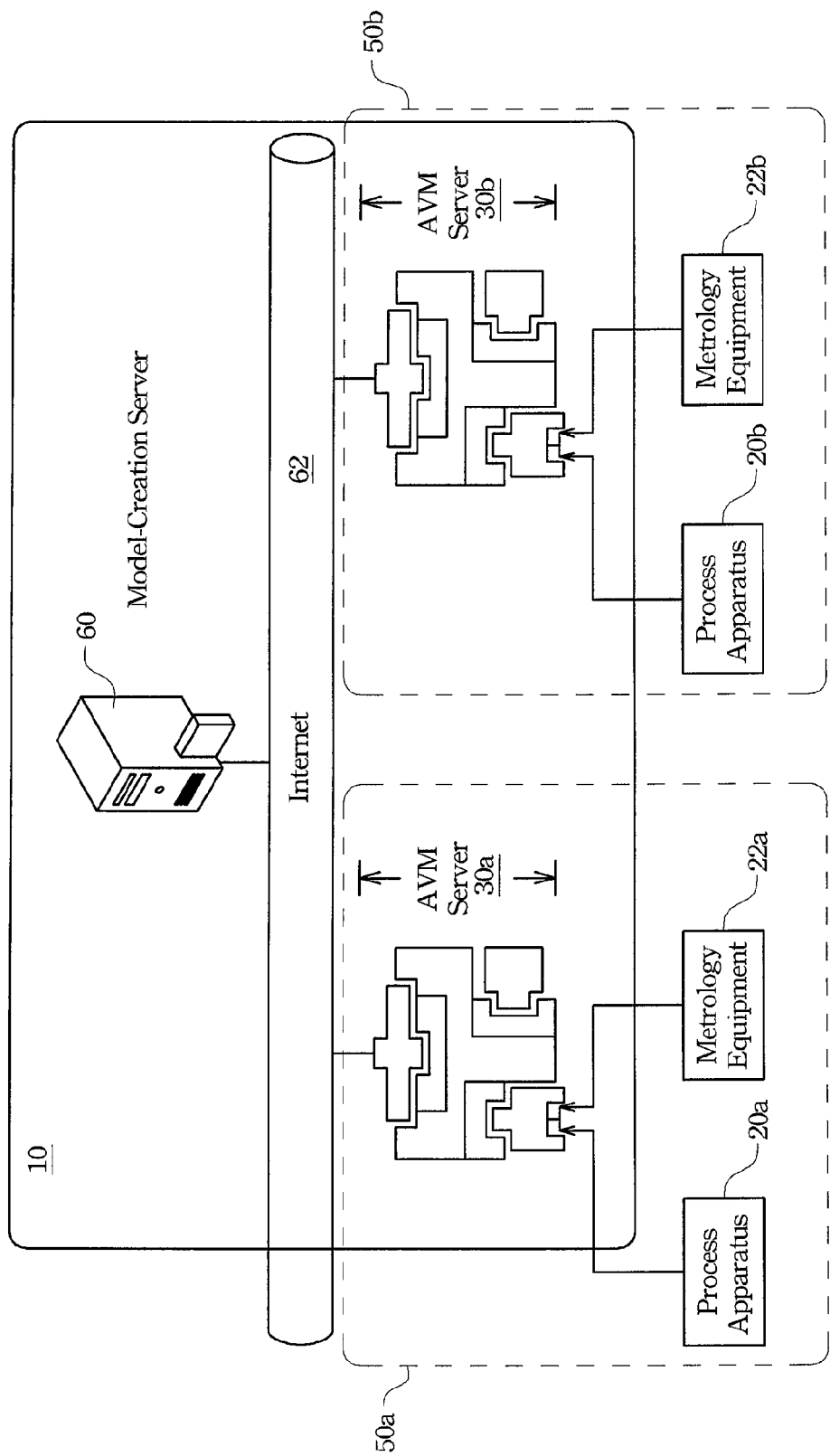
FIG. 1 is a schematic block diagram showing the structure of an AVM system according to an embodiment of the present invention.

Reference will now be made in detail to the preferred embodiments of the present invention, examples of which are illustrated in the accompanying drawings. Wherever possible, the same reference numbers are used in the drawings and the description to refer to the same or like parts.

Referring to FIG. 1, FIG. 1 is a schematic block diagram showing the structure of an AVM system according to an embodiment of the present invention. The AVM system comprises a model-creation server 60 and a plurality of VM units 50a and 50b, wherein the VM units 50a and 50b can communicate with the model-creation server 60 through Internet 62. The VM unit 50a comprises an AVM server 30a, a process apparatus 20a and a metrology equipment 22a; and the VM unit 50b comprises an AVM server 30b, a process apparatus 20b and a metrology equipment 22b. The process apparatus 20a has a plurality of sets of historical process data of the workpieces which have been processed; and a set of first process data of a first workpiece which is being or to be processed. The process apparatus 20b has a set of second process data of a second workpiece which is being or to be processed. The metrology equipment 22a has a plurality of historical measurement values of the workpieces which have been processed, and is measuring or will measure a first actual measurement value of the first workpiece, wherein those actual measurement values are corresponding to the sets of process data in the process apparatus 20a. The metrology equipment 22b is measuring or will measure a second actual measurement value of the second workpiece, wherein the second actual measurement value is corresponding to the set of second process data. In the AVM system 10, the model-creation server 60 first uses the sets of historical process data (collected from the process apparatus 20a) and the historical measurement values (collected from the metrology equipment 22a) corresponding thereto to build a set of VM models, and then automatically fan out or port the set of VM models to the AVM server 30b, so that the AVM 30b can conduct virtual metrology on the second workpiece which is being produced by the process apparatus 20b and does not need to develop another VM models for the process apparatus 20b with the same efforts for building the first set of models. Further, since the process apparatus 20a and 20b may be the different process chambers of the same equipment or the same type of equipment, their physical features are not quite the same. Thus, the AVM server 30b will use the set of second process data and the second actual measurement value corresponding thereto to replace the oldest data in a plurality of sets of historical process data and a plurality of historical measurement values used for creating VM models, thereby rebuilding (refreshing) the newly-ported VM models for recovering or maintaining the satisfactory accuracy of the VM models in the AVM server 30*b*. The procedure mentioned above is the so-called "model-refreshing procedure". Similarly, the AVM server 30*a* also can use the set of first process data and the first actual measurement value corresponding thereto to replace the oldest data in a plurality of sets of historical process data and a plurality of historical measurement values used for creating VM models, thereby retraining its VM models for recovering or maintaining the desirable accuracy of the VM models in the AVM server 30*a*. After a plurality of first workpieces or second workpieces are produced and measured, the sets of historical process data and the historical measurement values all will be replaced by the sets of first process data and the first actual measurement values or by the sets of second process data and the second actual measurement values. From then on, a newly collected sets of first or second process data and first or second actual measurement values will merely added to the current pool of process data and actual measurement values, but not replace the oldest data therein.

Broadly speaking, the "process data" used in the present embodiment may include sensor data, equipment state data and prior-process metrology values of a process apparatus (production equipment), wherein the prior-process metrology values are the VM values and/or the actual measurement values of a process prior to the process in this process apparatus.

The VM models of the present embodiment comprise a conjecture model, a RI model, a GSI model, a $DQI_x$ model and a $DQI_y$ model. The conjecture model is used for generating VM values for the aforementioned first workpiece and second workpiece, wherein the conjecture model is built in accordance with a conjecture algorithm such as a neural network (NN) algorithm, a multi-regression algorithm, a support vector machines (SVM) algorithm or any other prediction algorithm. The RI model is used to generate a reliance index of the virtual metrology value, wherein the RI model is built in accordance with a reference algorithm such as a multi-regression algorithm, a neural network algorithm, a SVM algorithm or any other prediction algorithm, wherein the reference algorithm has to be different from the aforementioned conjecture algorithm. The GSI model is used to compute a global similarity index for the aforementioned first process data, wherein the GSI model is built in accordance with a Mahalanobis distance algorithm. The $DQI_x$ model is used to compute a process data quality index ($DQI_x$) for the aforementioned first or second process data, wherein the $DQI_x$ model is built in accordance with a principal component analysis (PCA) and a Euclidean distance (ED) algorithm. The $DQI_y$ model is used to compute a metrology data quality index ($DQI_y$) for the aforementioned first or second actual measurement values used to build the VM models, wherein the $DQI_y$ model is built in accordance with adaptive resonance theory 2 (ART2) and normalized variability (NV).

Figure 2:
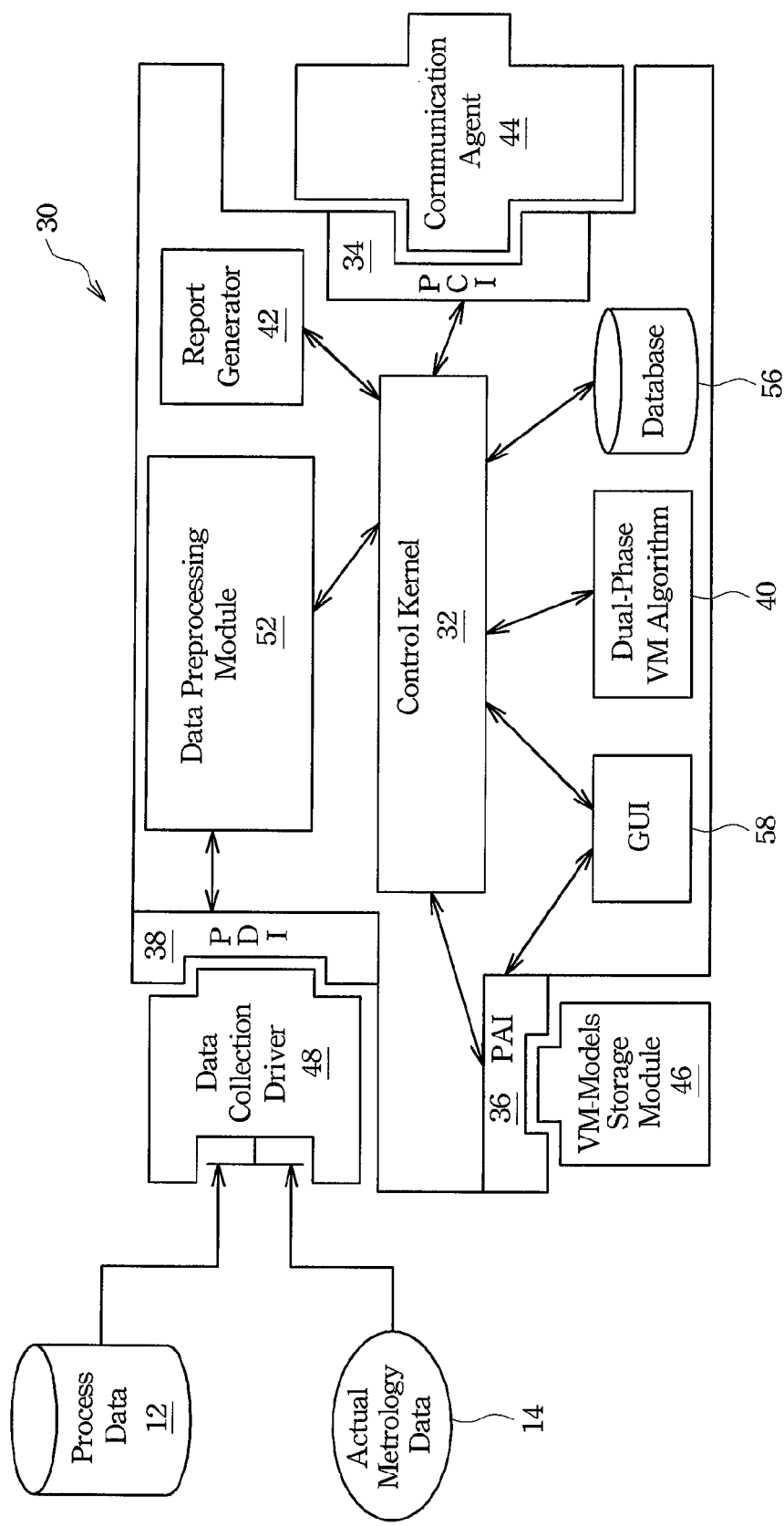
FIG. 2 is a schematic block diagram showing the structure of an AVM server according to the embodiment of the present invention.

Referring to FIG. 2, FIG. 2 is a schematic block diagram showing the structure of an AVM server according to the embodiment of the present invention. Since the structures and the functions of the respective components are the same for the AVM 30*a* and the AVM 30*b* shown in FIG. 1, an AVM 30 is used as an example for explanation. In the AVM server 30, a control kernel 32 is in charge of monitoring the states of respective modules in the AVM server 30, and controlling the operation procedure of each module in accordance with a dual-phase virtual metrology algorithm 40; a database 56 is used to provide the AVM server 30 for storing the information of system status, prediction results and all of models related to data quality evaluation of various types of data and VM conjecture; a graphic-user interface (GUI) 58 provides a user with the functions for monitoring system status and prediction results and setting parameters, etc.; a report generator 42 may generate the information reports of system status and prediction results etc. required for control; a data pre-processing module 52 is based on the $DQI_x$ model and the $DQI_y$ model to evaluate the quality of process data and actual measurement values; a PDI 38 is used to connect a data collection driver 48 for collecting process data 12 and actual metrology data 14 (measurement values), wherein the collected process data and metrology data are provided to a data pre-processing module 52 via the PDI 38. The PDI 38 has the function of pluggability, i.e. the pluggability of PDI 38 may enable the AVM server 30 to collect various process and metrology data from different types of equipment by changing the data collection driver 48 to an appropriate one. A pluggable communication interface (PCI) 34 is used to connect a communication agent 44 for communicating with the model-creation server 60 shown in FIG. 1, wherein the PCI 34 has the function of pluggability, i.e. the pluggability of PCI 34 may enable the AVM server 30 to communicate with the remote application model of various information interface formats by changing the communication agent 44 to an appropriate one. A pluggable application interface (PAI) 36 is used to connect a VM-models storage module 46 in which a set of VM models in use is stored. The PAI 36 also has the function of pluggability, i.e. the pluggability of PAI 36 may enable the AVM server 30 to change the set of VM models to an appropriate set in accordance with the specific type of equipment.

The following presents the algorithms related to the RI and GSI and explains their operating procedures. The $DQI_x$ model and the $DQI_y$ model will be explained in the subsequent flow process.

The RI and GSI are used to learn in real time whether the VM value is reliable. The RI model is used to compute a RI value between 0 and 1 by analyzing the process data of the process apparatus, thereby determining whether the virtual metrology result can be trusted. The GSI model is used to compute the GSI value for the process. The GSI is defined as the degree of similarity between the current set of input process data and all of the sets of the process data used for building or training the models.

Reliance Index (RI)

Referring to Table 1, n sets of historical data are assumed to be collected, including process data ($X_i$, i=1, 2, . . . , n) and the corresponding actual measurement values ($y_i$, i=1, 2 . . . , n), where each set of process data contains p individual parameters (from parameter 1 to parameter p), namely $X_i=[x_{i,1}, x_{i,2}, \ldots, x_{i,p}]^T$. Additionally, (m−n) sets of process data in actual production were also collected, but no actual measurement values are available besides $y_{n+1}$, That is, only the first among (m−n) pieces of the products is selected and actually measured. In the current manufacturing practice, the actual measurement value $y_{n+1}$, obtained is used to infer and evaluate the quality of the (m−n−1) pieces of the products.

TABLE 1

| Sample Data Set | Parameter 1 | Parameter 2 | Parameter p | Actual Measurement Value |
|---|---|---|---|---|
| 1 | $x_{1,1}$ | $x_{1,2}$ | ... $x_{1,p}$ | $y_1$ |
| 2 | $x_{2,1}$ | $x_{2,2}$ | ... $x_{2,p}$ | $y_2$ |
| ... | ... | ... | ... ... | ... |
| n | $x_{n,1}$ | $x_{n,2}$ | ... $x_{n,p}$ | $y_n$ |
| n + 1 | $x_{n+1,1}$ | $x_{n+1,2}$ | ... $x_{n+1,p}$ | $y_{n+1}$ |

TABLE 1-continued

| Sample Data Set | Parameter 1 | Parameter 2 | ... | Parameter p | Actual Measurement Value |
|---|---|---|---|---|---|
| n + 2 | $x_{n+2,1}$ | $x_{n+2,2}$ | ... | $x_{n+2,p}$ | Zip |
| ... | ... | ... | ... | ... | ... |
| m | $x_{m,1}$ | $x_{m,2}$ | ... | $x_{m,p}$ | Zip |

As shown in Table 1, $y_1, y_2, \ldots, y_n$ are historical measurement values, and $y_{n+1}$ is the actual measurement value of the first piece of the products being manufactured. Generally, a set of actual measurement values ($y_i$, i=1, 2, ... n) is a normal distribution with mean µ and standard deviation σ, namely $y_i \sim N(\mu, \sigma^2)$.

All the actual measurement values can be standardized in terms of the mean and standard deviation of the sample set ($y_i$, i=1, 2 ..., n). Their standardized values (also called z scores) $Z_{y_1}, Z_{di\ y_2}, \ldots, Z_{y_n}$ are thus derived, where each z score has mean zero and standard deviation one, namely $Z_{y_i} \sim N(0, 1)$. Regarding the actual measurement data, a corresponding $Z_{y_i}$ close to 0 indicates that the actual measurement value approaches the central value of the specification. The equations for standardization are listed as follows:

$$Z_{y_i} = \frac{y_i - \bar{y}}{\sigma_y}, i = 1, 2, \ldots, n \quad (1)$$

$$\bar{y} = \frac{1}{n}(y_1 + y_2 + \ldots + y_n) \quad (2)$$

$$\sigma_y = \sqrt{\frac{1}{n-1}[(y_1 - \bar{y})^2 + (y_2 - \bar{y})^2 + \ldots + (y_n - \bar{y})^2]} \quad (3)$$

wherein $y_i$ is the i-th actual measurement value,
$Z_{y_i}$ is the standardized i-th actual measurement value,
$\bar{y}$ is the mean of all the actual measurement values, and
$\sigma_y$ is the standard deviation of all the actual measurement values.

The explanation herein adopts a neural-network (NN) algorithm as the conjecture algorithm for establishing the conjecture model performing virtual measurement, and uses such as a multi-regression (MR) algorithm to be the reference algorithm for establishing the reference model that serves as a comparison base for the conjecture model. However, the present invention can also apply other algorithms to be the conjecture algorithm or the reference algorithm, provided the reference algorithm differs from the conjecture algorithm, such as a SVM algorithm and other related algorithms, and thus the present invention is not limited thereto.

When the NN and MR algorithms are utilized, if their convergence conditions both are that SSE (Sum of Square Error) is minimized with n→∞, their standardized predictive measurement values (defined as $Z_{y_{Ni}}$ and $Z_{y_{ri}}$ respectively) should be the same as the standardized actual measurement value $Z_{y_i}$. Restated, when n→∞, $Z_{y_i} = Z_{y_{Ni}} = Z_{y_{ri}}$ all represent the standardized actual measurement value, but they have different names due to having different purposes and different estimating models. Hence, $Z_{y_{Ni}} \sim N(\mu_{Z_{y_i}}, \sigma_{Z_y}^2)$ and $Z_{y_{ri}} \sim N(\mu_{Z_{y_i}}, \sigma_{Z_y}^2)$ indicate that $Z_{y_{Ni}}$ and $Z_{y_{ri}}$ share the same statistical distribution. However, owing to the existence of different estimating models, the estimations of mean and standard deviation differ between those two prediction algorithms. Namely the standardized mean-estimating equation ($\hat{\mu}_{Z_{yi}} = Z_{\hat{y}_{Ni}}$) and standard-deviation-estimating equation ($\hat{\sigma}_{Z_y} = \hat{\sigma}_{Z_{\hat{y}N}}$) with respect to the NN conjecture model differ from the standardized mean-estimating equation ($\hat{\mu}_{Z_{yi}} = Z_{\hat{y}_{ri}}$) and standard-deviation-estimating equation ($\hat{\sigma}_{Z_y} = \hat{\sigma}_{Z_{\hat{y}r}}$) with respect to the MR reference model.

The RI is designed to gauge the reliance level of the virtual metrology value. The RI thus should consider the degree of similarity between the statistical distribution $Z_{\hat{y}_{Ni}}$ of the virtual metrology value and the statistical distribution $Z_{y_i}$ of the actual measurement value. However, when virtual metrology is applied, no actual measurement value can be used to verify the trustworthiness of the virtual metrology value. (Notably, virtual metrology becomes unnecessary if actual measurement values are obtained.) Instead, the present invention adopts the statistical distribution $Z_{\hat{y}_{ri}}$ estimated by the reference algorithm which is such as the MR algorithm to replace $Z_{y_i}$. The reference algorithm also can be such as a time-series algorithm and other related algorithms, and thus the present invention is not limited thereto.

Figure 3:
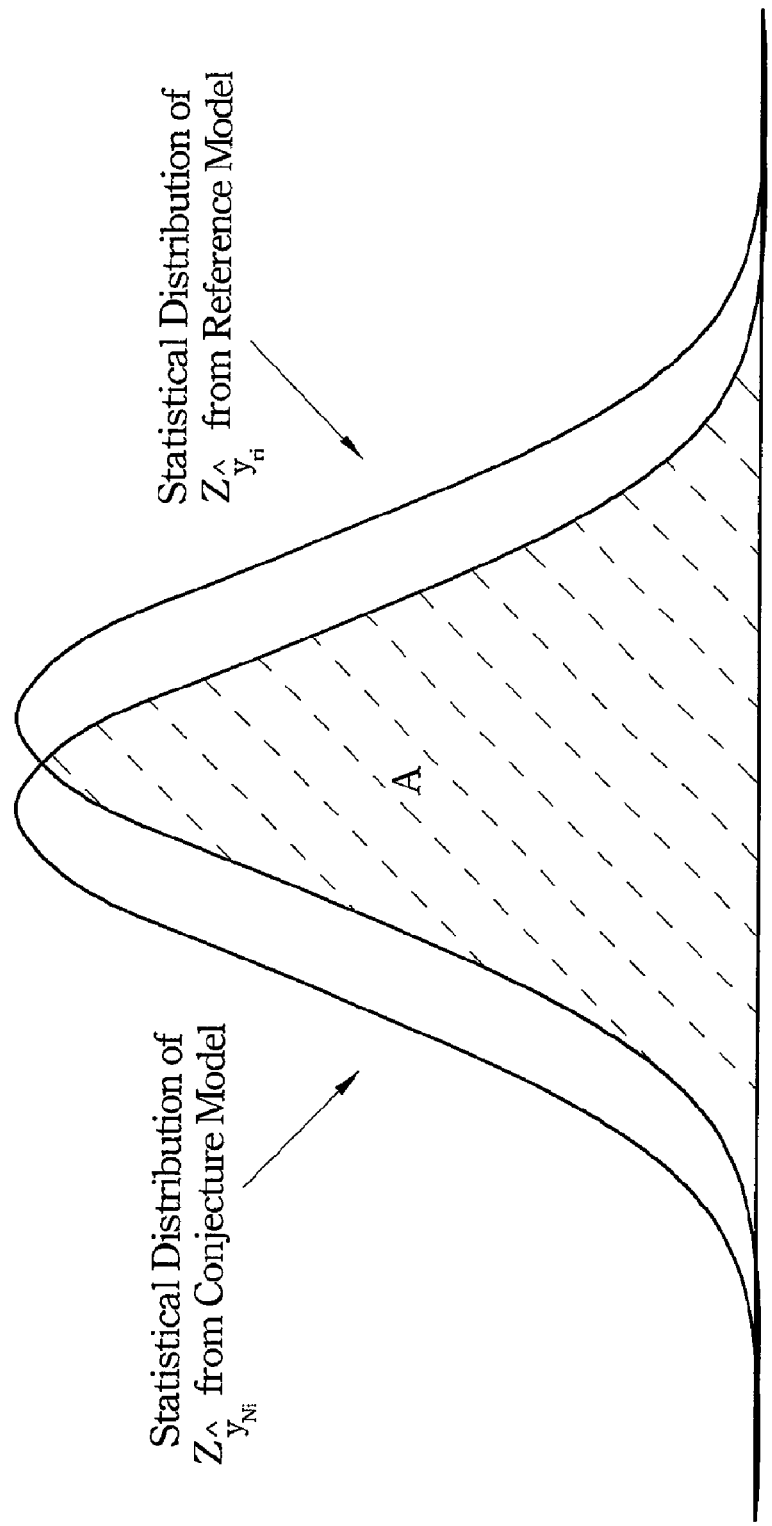
FIG. 3 is a schematic diagram for explaining the reliance index (RI) according to the embodiment of the present invention.

Referring to FIG. 3, FIG. 3 is a schematic diagram for explaining the reliance index (RI according to the preferred embodiment of the present invention. The RI of the present invention is defined as the intersection-area value (overlap area A) between the statistical distribution $Z_{\hat{y}_N}$ of the virtual metrology value from the conjecture model (built by such as the NN algorithm) and the statistical distribution $Z_{\hat{y}_{ri}}$ of the reference prediction value from the reference model (built by such as the MR algorithm). As such, the RI equation is listed below:

$$RI = 2 \int_{\frac{Z_{\hat{y}_{Ni}} + Z_{\hat{y}_{ri}}}{2}}^{\infty} \frac{1}{\sqrt{2\pi}\ \sigma} e^{-\frac{1}{2}(\frac{x-\mu}{\sigma})^2} dx \quad (4)$$

with $\mu = Z_{\hat{y}_{Ni}}$ if $Z_{\hat{y}_{Ni}} < Z_{\hat{y}_{ri}}$ $\mu = Z_{\hat{y}_{ri}}$ if $Z_{\hat{y}_{ri}} < Z_{\hat{y}_{Ni}}$ and σ is set to be 1.

The RI increases with increasing overlap area A. This phenomenon indicates that the result obtained using the conjecture model is closer to that obtained from the reference model, and thus the corresponding virtual metrology value is more reliable. Otherwise, the reliability of the corresponding measurement value reduces with decreasing RI. When the distribution $Z_{\hat{y}_{Ni}}$ estimated from $Z_{y_{Ni}}$ is fully overlapped with the distribution $Z_{\hat{y}_{ri}}$ estimated from $Z_{y_{ri}}$, then according to the distribution theory of statistics, the RI value equals 1; and, when those two distributions are almost separate, the RI value approaches 0.

Hereinafter, the method for calculating the statistical distribution of the virtual metrology values ($Z_{\hat{y}_{Ni}}$ and $\hat{\sigma}_{Z_{\hat{y}N}}$) from the conjecture model is explained.

In the NN conjecture model, if the convergence condition is to minimize SSE, then it can be assumed that "for given $Z_{x_{i,j}}$, $Z_{y_{Ni}}$ is the distribution with mean $\mu_{Z_{y_i}}$ and standard deviation $\sigma_{Z_y}$", namely for given $Z_{x_{i,j}}$, $Z_{y_{Ni}} \sim N(\mu_{Z_{y_i}}, \sigma_{Z_y}^2)$, where the NN estimating equation of $\mu_{Z_{y_i}}$ is $\hat{\mu}_{Z_{y_i}} = Z_{\hat{y}_{Ni}}$, and the NN estimating equation of $\sigma_{Z_y}^2$ is $\hat{\sigma}_{Z_y}^2 = \hat{\sigma}_{Z_{\hat{y}N}}^2$.

Before the NN conjecture model is constructed, the process data must be standardized. The equations for standardizing the process data are presented below:

$$Z_{x_{i,j}} = \frac{x_{i,j} - \bar{x}_j}{\sigma_{x_j}}, i = 1, 2, \ldots, n, \quad (5)$$

$$n+1, \ldots, m; j = 1, 2, \ldots, p$$

$$\bar{x}_j = \frac{1}{n}(x_{1,j} + x_{2,j} + \ldots + x_{n,j}) \quad (6)$$

$$\sigma_{x_j} = \sqrt{\frac{1}{n-1}[(x_{1,j} - \bar{x}_j)^2 + (x_{2,j} - \bar{x}_j)^2 + \ldots + (x_{n,j} - \bar{x}_j)^2]} \quad (7)$$

wherein $x_{i,j}$ is the j-th process parameter in the i-th set of process data, $Z_{x_{i,j}}$ is the standardized j-th process parameter in the i-th set of process data;

$\bar{x}_j$ is the mean of the j-th process data;

$\sigma_{x_j}$ is the standard deviation of the j-th process data.

The n sets of standardized process data ($Z_{x_{i,j}}$, i=1, 2, ..., n; j=1, 2, ..., p) and the n standardized actual measurement values ($Z_{y_i}$, i=1, 2, ..., n) are utilized to build the NN conjecture model. The m sets of standardized process data ($Z_{x_{i,j}}$, i=1, 2, ..., m; j=1, 2, ..., p) are then inputted into the NN conjecture model to obtain the corresponding standardized virtual metrology values: $Z_{\hat{y}_{N1}}, Z_{\hat{y}_{N2}}, \ldots, Z_{\hat{y}_{Nn}}, Z_{\hat{y}_{Nn+1}}, \ldots, Z_{\hat{y}_{Nm}}$.

Accordingly, the estimated value of $\mu_{Z_{y_i}}$ (i.e. $\hat{\mu}_{Z_{y_i}} = Z_{\hat{y}_{Ni}}$) and the estimated value of $\sigma_{Z_y}$ (i.e. $\hat{\sigma}_{Z_y} = \hat{\sigma}_{Z_{\hat{y}N}}$) can be computed as follows:

$$\hat{\mu}_{Z_{y_i}} = Z_{\hat{y}_{Ni}}, i = 1, 2, \ldots, n, n+1, \ldots, m \quad (8)$$

$$\hat{\sigma}_{Z_{\hat{y}N}} = \quad (9)$$
$$\sqrt{\frac{1}{n-1}[(Z_{\hat{y}_{N1}} - \bar{Z}_{\hat{y}_N})^2 + (Z_{\hat{y}_{N2}} - \bar{Z}_{\hat{y}_N})^2 + \ldots + (Z_{\hat{y}_{Nn}} - \bar{Z}_{\hat{y}_N})^2]}$$

$$\bar{Z}_{\hat{y}_N} = \frac{1}{n}(Z_{\hat{y}_{N1}} + Z_{\hat{y}_{N2}} + \ldots + Z_{\hat{y}_{Nn}}) \quad (10)$$

wherein $\bar{Z}_{\hat{y}_N}$ is the mean of the standardized virtual metrology values.

Hereinafter, the method for calculating the reference predication values ($Z_{\hat{y}_{ri}}$ and $\hat{\sigma}_{Z_{\hat{y}r}}$) from the MR model is explained.

The basic assumption of the MR is that "for given $Z_{x_{i,j}}$, $Z_{y_i}$ is the distribution with mean $\mu_{Z_{y_i}}$ and standard deviation $\sigma_{Z_y}$", namely for given $Z_{x_{i,j}}$, $Z_{y_i} \sim N(\mu_{Z_{y_i}}, \sigma_{Z_y}^2)$, wherein the MR estimating equation of $\mu_{Z_{y_i}}$ is $\hat{\mu}_{Z_{y_i}} = Z_{\hat{y}_{ri}}$, and the MR estimating equation of $\sigma_{Z_y}^2$ is $\hat{\sigma}_{Z_y}^2 = \hat{\sigma}_{Z_{\hat{y}r}}^2$.

To obtain the MR relationship between the n sets of standardized process data ($Z_{x_{i,j}}$, i=1, 2, ..., n; j=1, 2, ..., p) and the n standardized actual measurement values, ($Z_{y_i}$, i=1, 2, ..., n), the weighting factors $\beta_r = [\beta_{r0}, \beta_{r2}, \ldots, \beta_{rp}]^T$ corresponding to those p parameters must be defined by using the MR analysis. The relationship between $Z_{y_i}$ and $Z_{x_{i,j}}$ thus is constructed as follows:

$$\beta_{r0} + \beta_{r1}Z_{x_{1,1}} + \beta_{r2}Z_{x_{1,2}} + \ldots + \beta_{rp}Z_{x_{1,p}} = Z_{y_1} \quad (11)$$
$$\beta_{r0} + \beta_{r1}Z_{x_{2,1}} + \beta_{r2}Z_{x_{2,2}} + \ldots + \beta_{rp}Z_{x_{2,p}} = Z_{y_2}$$
$$\ldots$$
$$\beta_{r0} + \beta_{r1}Z_{x_{n,1}} + \beta_{r2}Z_{x_{n,2}} + \ldots + \beta_{rp}Z_{x_{n,p}} = Z_{y_n}$$

Let $$Z_y = \begin{pmatrix} Z_{y_1} \\ Z_{y_2} \\ \vdots \\ Z_{y_n} \end{pmatrix} \quad (12)$$

and $$Z_x = \begin{pmatrix} 1 & 1 & \ldots & Z_{x_{1,p}} \\ 1 & Z_{x_{2,1}} & \ldots & Z_{x_{2,p}} \\ \vdots & \vdots & \ddots & \vdots \\ 1 & Z_{x_{n,1}} & \ldots & Z_{x_{n,p}} \end{pmatrix} \quad (13)$$

The least square method can obtain the estimating equation of $\beta_r$, $\hat{\beta}_r = [\hat{\beta}_{r0}, \hat{\beta}_{r1}, \ldots \hat{\beta}_{rp}]^T$ as $$\hat{\beta}_r = (Z_x^T Z_x)^{-1} Z_x^T Z_y \quad (14)$$

Therefore, the MR reference model can be obtained as $$Z_{\hat{y}_{ri}} = \hat{\beta}_{r0} + \hat{\beta}_{r1}Z_{x_{i,1}} + \hat{\beta}_{r2}Z_{x_{i,2}} + \ldots + \hat{\beta}_{rp}Z_{x_{i,p}} \quad i=1, 2, \ldots, n, \quad n+1, \ldots, m \quad (15)$$

Hence, during the conjecture phase, after inputting a set of process data, its MR estimating value $Z_{\hat{y}_{ri}}$ corresponding thereto can be obtained via equation (15). The MR estimating equation of the standard deviation $\sigma_{Z_y}$ is $\hat{\sigma}_{Z_{\hat{y}r}}$ with $$\hat{\sigma}_{Z_{\hat{y}r}} = \sqrt{\frac{1}{n-1}[(Z_{\hat{y}_{r1}} - \bar{Z}_{\hat{y}_r})^2 + (Z_{\hat{y}_{r2}} - \bar{Z}_{\hat{y}_r})^2 + \ldots + (Z_{\hat{y}_{rn}} - \bar{Z}_{\hat{y}_r})^2]} \quad (16)$$

$$\bar{Z}_{\hat{y}_r} = \frac{1}{n}(Z_{\hat{y}_{r1}} + Z_{\hat{y}_{r2}} + \ldots + Z_{\hat{y}_{rn}}) \quad (17)$$

After obtaining the NN estimating equations ($Z_{\hat{y}_{Ni}}$ and $\hat{\sigma}_{Z_{\hat{y}N}}$) and the MR estimating equations ($Z_{\hat{y}_{ri}}$ and $\hat{\sigma}_{Z_{\hat{y}r}}$), their normal distribution curves can be depicted, as illustrated in FIG. 3. Thus, the RI of each virtual metrology value can be derived by calculating the intersection area value (overlap area A).

After obtaining the RI, the RI threshold value ($RI_T$) must be defined. If $RI > RI_T$, then the reliance level of the virtual metrology value is acceptable. A systematic approach for determining the $RI_T$ is described below.

Before determining the $RI_T$, it is necessary to define a maximal tolerable error limit ($E_L$). The error of the virtual metrology value is an absolute percentage of the difference between the actual measurement value $y_i$ and $\hat{y}_{Ni}$ obtained from the NN conjecture model divided by the mean of all the actual measurement values, $\bar{y}$, namely $$Error_i = \left|\frac{y_i - \hat{y}_{Ni}}{\bar{y}}\right| \times 100\% \quad (18)$$

Figure 4:
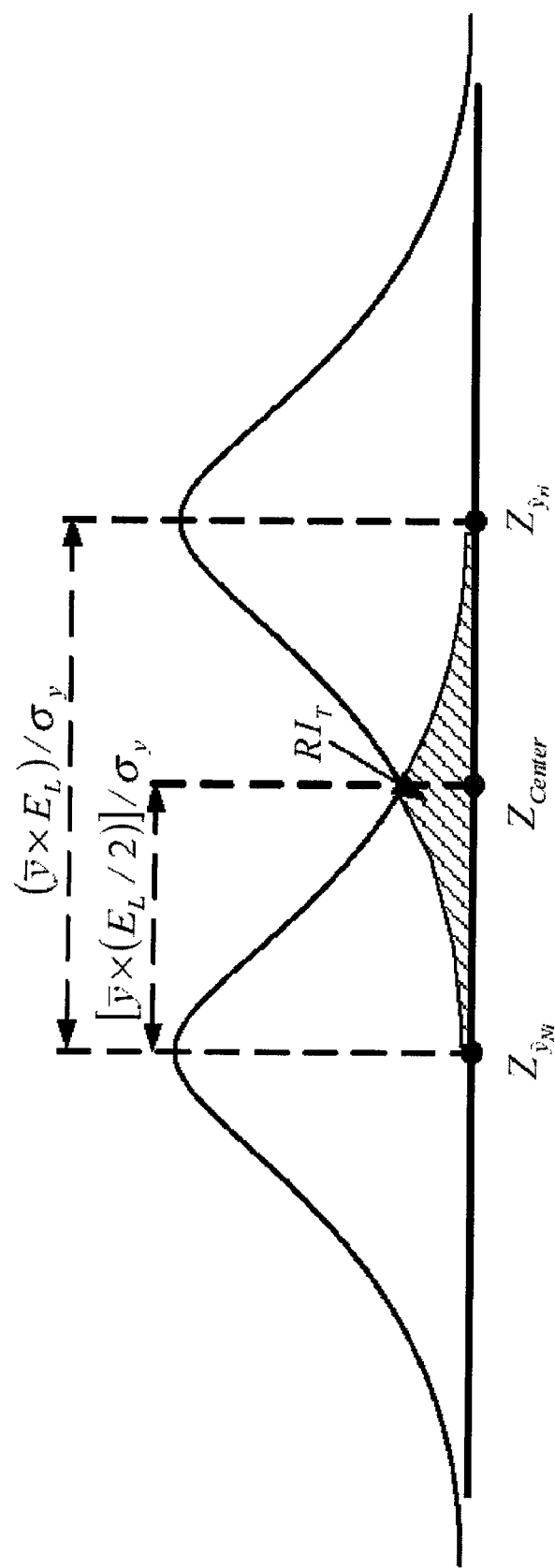
FIG. 4 is a schematic diagram for defining the RI threshold ($RI_T$) according to the embodiment of the present invention.

The $E_L$ can then be specified based on the error defined in equation (18) and the accuracy specification of virtual metrology (VM). Consequently, $RI_T$ is defined as the RI value corresponding to the $E_L$, as shown in FIG. 4. That is $$RI_T = 2\int_{Z_{Center}}^{\infty} \frac{1}{\sqrt{2\pi}\,\sigma} e^{-\frac{1}{2}\left(\frac{x-\mu}{\sigma}\right)^2} dx \quad (19)$$

with $\mu$ and $\sigma$ defined in equation (4) and $$Z_{Center} = Z_{\hat{y}_{Ni}} + [\bar{y} \times (E_L/2)]/\sigma, \quad (20)$$

where $\sigma_y$ is specified in equation (3).

Global Similarity Indexes (GSI)

As mentioned above, when virtual metrology is applied, no actual measurement value is available to verify the accuracy of the virtual metrology value. Therefore, instead of the standardized actual measurement value $Z_{y_i}$, the standardized MR prediction value $Z_{\hat{y}_{ri}}$ is adopted to calculate the RI. This substitution may cause inevitable gauging errors in the RI. To compensate for this unavoidable substitution, a global similarity index (GSI) is provided to help the RI gauge the reliance level of virtual metrology and identifying the key process parameters with large deviations (z score values).

The GSI assesses the degree of similarity between any set of process data and the model set of process data. This model set is derived from all of the sets of historical process data used for building the conjecture model.

The present invention may utilize a statistical distance measure, such as Mahalanobis distance, to quantify the degree of similarity. Mahalanobis distance is a distance measure introduced by P. C. Mahalanobis in 1936. This measure is based on correlation between variables to identify and analyze different patterns of sample sets. Mahalanobis distance is a useful way of determining similarity of an unknown sample set to a known one. This method considers the correlation of the data set and is scale-invariant, namely it is not dependent on the scale of measurements. If the data set has high similarity, the calculated Mahalanobis distance calculated will be relatively small.

The present invention uses the calculated GSI (applying Mahalanobis distance) size to determine whether the newly input set of process data is similar to the model set of process data. If the calculated GSI is small, the newly input set is relatively similar to the model set. Thus the virtual metrology value of the newly input (high-similarity) set is relatively accurate. On the contrary, if the calculated GSI is too large, the newly input set is somewhat different from the model set. Consequently, the virtual metrology value estimated in accordance with the newly input (low-similarity) set has low reliance level in terms of accuracy.

The equations to calculate the standardized process data $Z_{x_{i,j}}$ of the conjecture model are shown in equations (5), (6) and (7). At first, the model set of the process parameters is defined as $X_M = [x_{M,1}, x_{M,2}, \ldots, x_{M,p}]^T$, where $x_{M,j}$ equals $\bar{x}_j$, $j = 1, 2, \ldots, p$, so that each element in the model set after standardization (also denoted as the standardized model parameter, $Z_{M,j}$) has a value of 0. Restated, all of the elements in $Z_M = [Z_{M,1}, Z_{M,2}, Z_{M,p}]^T$ are 0. Thereafter, the correlation coefficients between the standardized model parameters are calculated.

Assuming that the correlation coefficient between the s-th parameter and the t-th parameter is $r_{st}$ and that there are k sets of data, then $$r_{st} = \frac{1}{k-1}\sum_{l=1}^{k} z_{sl} \cdot z_{tl} = \frac{1}{k-1}(z_{s1}\cdot z_{t1} + z_{s2}\cdot z_{t2} + \ldots + z_{sk}\cdot z_{tk}) \quad (21)$$

After calculating the correlation coefficients between the standardized model parameters, the matrix of correlation coefficients can be obtained as $$R = \begin{bmatrix} 1 & r_{12} & \ldots & r_{1p} \\ r_{21} & 1 & \ldots & r_{2p} \\ \vdots & \vdots & \ddots & \vdots \\ r_{p1} & r_{p2} & \ldots & 1 \end{bmatrix} \quad (22)$$

Assuming that the inverse matrix ($R^{-1}$) of R is defined as A, then $$A = R^{-1} = \begin{bmatrix} a_{11} & a_{12} & \ldots & a_{1p} \\ a_{21} & a_{22} & \ldots & a_{2p} \\ \ldots & \ldots & \ldots & \ldots \\ a_{p1} & a_{p2} & \ldots & a_{pp} \end{bmatrix} \quad (23)$$

Hence, the equation for calculating the Mahalanobis distance ($D_\lambda^2$) between the standardized λ-th set process data ($Z_\lambda$) and the standardized model set process data ($Z_M$) is as follows.

$$D_\lambda^2 = (Z_\lambda - Z_M)^T R^{-1} (Z_\lambda - Z_M) \quad (24)$$
$$= Z_\lambda^T R^{-1} Z_\lambda$$

Finally, we have $$D_\lambda^2 = \sum_{j=1}^{p}\sum_{i=1}^{p} a_{ij} z_{i\lambda} z_{j\lambda} \quad (25)$$

The GSI of the standardized λ-th set process data is, then, equal to $D_\lambda^2/p$.

After obtaining the GSI, the GSI threshold ($GSI_T$) should be defined as the following:

$$GSI_T = a * \overline{GSI}_{LOO} \quad (26)$$

In the so-called cross validation's leave-one-out (LOO) method, one sample data set is selected from all sets of process data used for building models as a simulated on-line test sample set, and then the remaining sets of process data are utilized to construct a GSI model, and thereafter the GSI model is used to compute a GSI value for the test sample set, i.e. $GSI_{LOO}$. The above steps are repeated on all of the sample data sets (process data) used for building models, thus computing all of the $GSI_{LOO}$ values of the respective sample data sets. Therefore, $\overline{GSI}_{LOO}$ shown in equation (26) stands for, for example, the 90% trimmed mean of all the $GSI_{LOO}$ values computed by the sample data sets respectively. The "a" shown in equation (26) is between 2 and 3, and can be slightly adjusted in accordance with the actual conditions, wherein "a" is predetermined to be 3.

Hereinafter, the operating procedure of the AVM system of the present invention is explained below.

Figure 5:
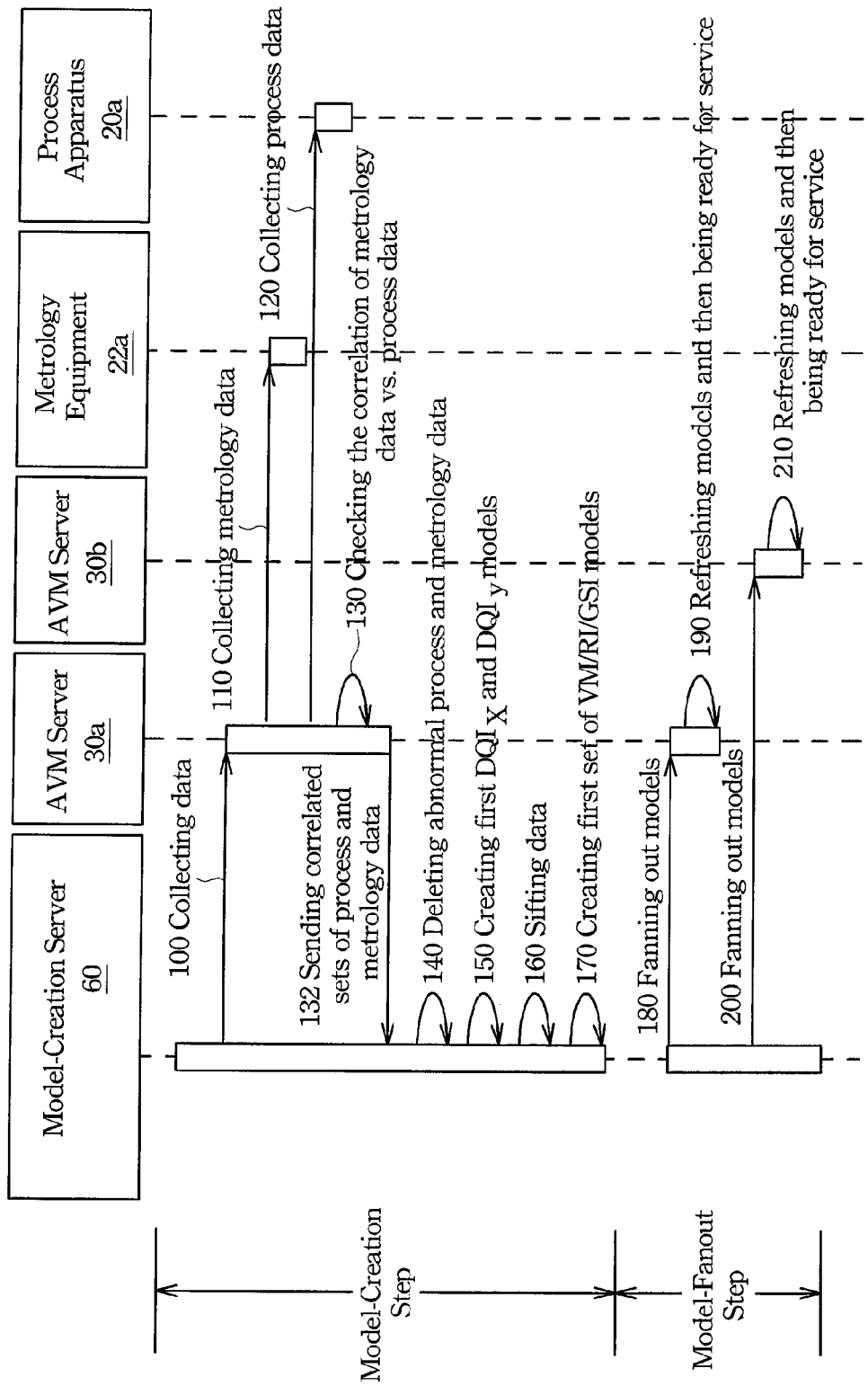
FIG. 5 is schematic diagram showing the operation sequence of the AVM system according to the embodiment of the present invention.

Referring to FIG. 1 and FIG. 5, FIG. 5 is schematic diagram showing the operation sequence of the AVM system according to the embodiment of the present invention, including a model-creation step for establishing a set of first VM models (the first set of VM models); and a model-fanout step for fanning out models. In the model-creation step, at first, the model-creation server 60 utilizes the AVM server 30a to collect the data required for building the VM models (step 100), wherein the data for building the VM models includes a plurality of sets of historical process data and a plurality of historical (actual) measurement values corresponding thereto. Then, the AVM server 30a is connected to the metrology equipment 22a via its data collection driver for collecting the historical metrology data (actual measurement values) (step 110)), and is connected to the process apparatus 20a via its data collection driver for collecting the historical process data (step 120). Thereafter, the AVM server 30a checks the correlation of the historical process data vs. the historical metrology data (step 130), i.e. to check if the corresponding relationships therebetween are correct. For example, the historical process data and the historical metrology data belonging to the same workpiece should have the same identification number. Then, the AVM server 30*a* sends all of the metrology and process data successfully correlated (i.e. the correlated data) to the model-creation server 60, thereby storing the correlated set of process and metrology data (step 132). Thereafter, the model-creation server 60 performs a data pre-processing step on the collected data needed for building models so as to delete abnormal process and metrology data, thus ensuring the correctness of the collected data (step 140). Then, the model-creation server 60 creates a first $DQI_x$ model and a first $DQI_y$ model (step 150), wherein the methods for building the $DQI_x$ and $DQI_y$ models will be described later. Thereafter, the model-creation server 60 applies the first $DQI_x$ model and the first $DQI_y$ model to perform a step 160 for sifting data, thereby selecting enough correlated process data and metrology data needed for building the conjecture model, the RI model and the GSI model with $NN_{RT}$, $MR_{RT}$ and $GSI_{RT}$ (step 170), wherein $NN_{RT}$, $MR_{RT}$ and $GSI_{RT}$ will be described later.

After the first set of VM models are built, a model-fanout step can be proceeded for porting the first set of VM models to the AVM server 30*a* and the AVM server 30*b* so as to conduct virtual metrology on the workpieces produced on the process apparatus 20*a* and the process apparatus 20*b*. In the model-fanout step, at first, the model-creation server 60 transfers the first set of conjecture model, RI model, GSI model, $DQI_x$ model and $DQI_y$ model to the AVM server 30*a* (step 180, and then the AVM server 30*a* performs a model-refreshing procedure (retraining step) promptly, and after the retraining step is completed, the VM models are ready for providing all the VM-related services (step 190). The model-creation server 60 also transfers the first set of conjecture model, RI model, GSI model, $DQI_x$ model and $DQI_y$ model to the AVM server 30*b* (step 200), and then the AVM server 30*b* performs the model-refreshing procedure (retraining step) promptly, and after the retraining step is completed, the VM models are ready for providing all the VM-related services (step 210).

Figure 6A:
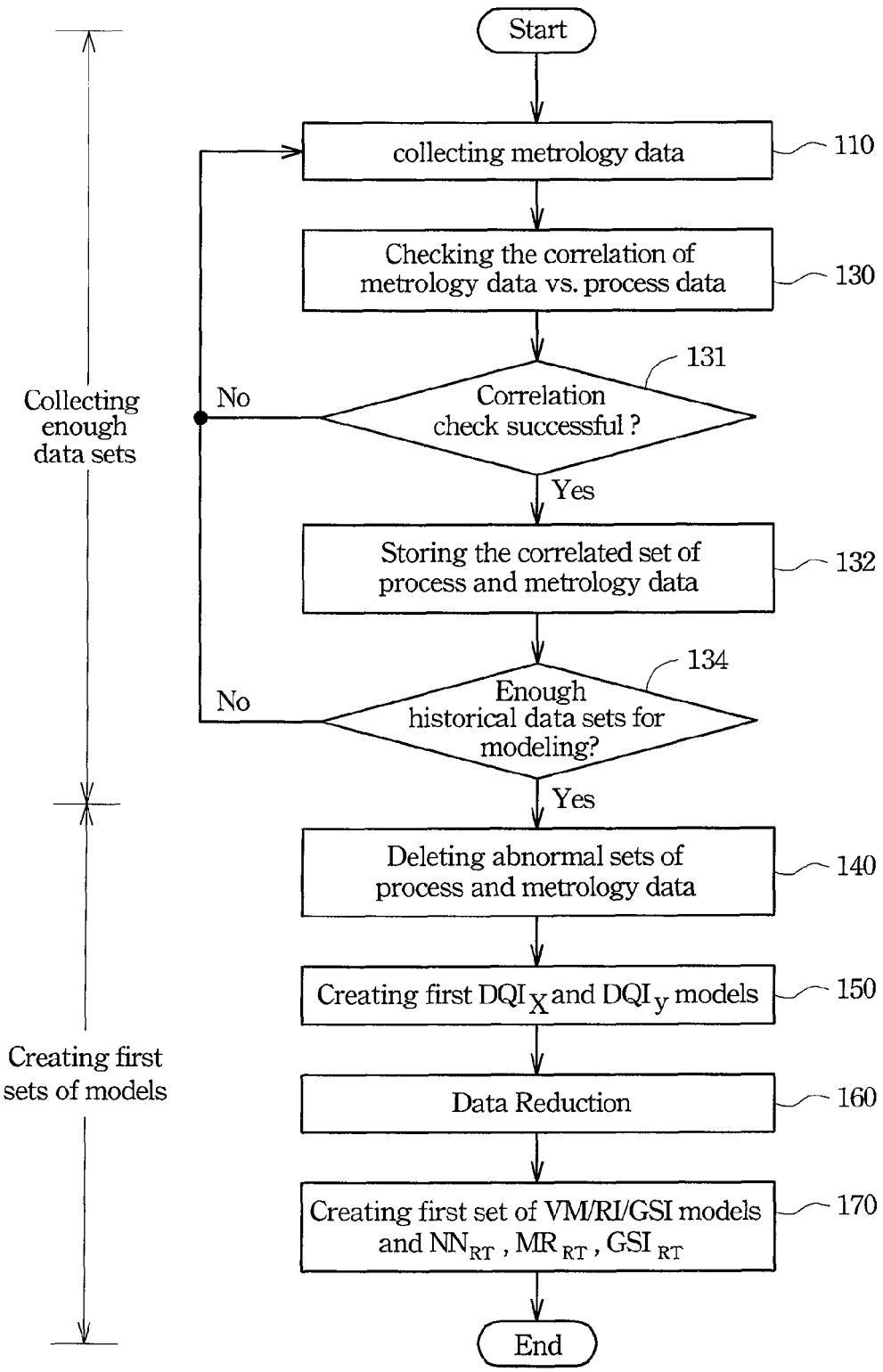
FIG. 6A is a schematic flow chart showing the model-creation step according the embodiment of the present invention.
Figure 6B:
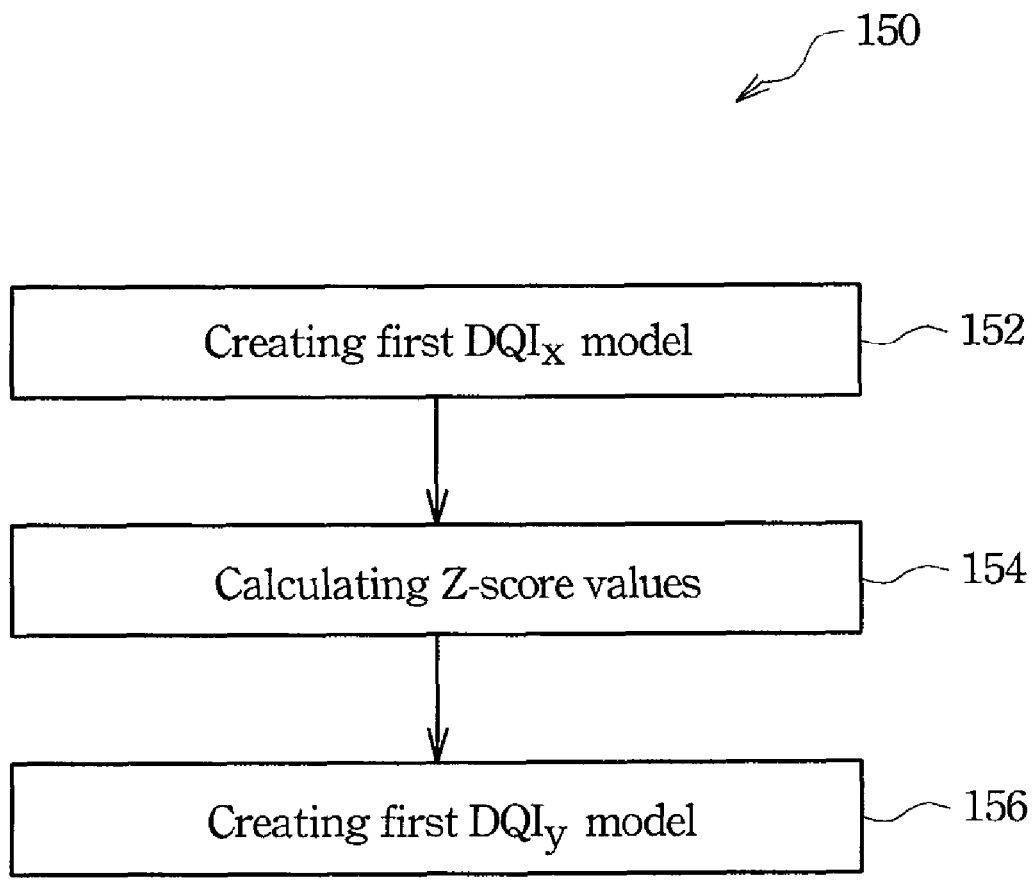
FIG. 6B is a schematic flow chart showing the step 150 for creating the first $DQI_x$ model and the first $DQI_y$ model according the embodiment of the present invention.

The steps for building the first set of VM models, and the steps of applying the dual-phase algorithm for refreshing models are described as follows Model-Creation Step When no VM models have ever been created for a certain type of process apparatus, the model-creation server 60 has to be used for establishing the first set of conjecture model, RI model, GSI model, $DQI_x$ model and $DQI_y$ model for the certain type of process apparatus. Referring to FIG. 6A, FIG. 6A is a schematic flow chart showing the model-creation step according the embodiment of the present invention. At first, step 110 is performed for collecting (historical) metrology data (actual measurement values). Practically, all of the actual measurement values should have their corresponding (historical) process data, and thus after one set of actual measurement values (metrology data) is collected, step 130 is promptly preformed for checking the correlation of metrology data vs. process data. Then, step 131 is performed for checking if the correlation check is successful, wherein if the correlation check is successful, step 132 is performed for storing the correlated set of process data and metrology data; otherwise, the process data are abandoned, and step 110 is performed again for collecting metrology data. Thereafter, step 134 is performed for determining if there are enough historical data sets (metrology and process data) for modeling. If the amount of the historical metrology and process data is enough, then a process engineer may perform step 140 to delete abnormal sets of process and metrology data, thereby ensuring the correctness of the data for building models. In step 140, the process engineer may inspect all sets of the historical process and metrology data one by one so as to establish process data standard temporal patterns; select proper indicators; and define abnormal modes of metrology data. Thereafter, the abnormal sets of process and metrology data are removed by applying the sets of historical process data to match the standard temporal patterns and by comparing the historical metrology data with the abnormal modes of metrology data. Then, the normal sets of historical metrology and process data obtained from step 140 are used to create the first $DQI_x$ model and the first $DQI_y$ model (step 150). Hereinafter, the flow process of step 150 is explained. Referring to FIG. 6B, FIG. 6B is a schematic flow chart showing the step 150 for creating the first $DQI_x$ model and the first $DQI_y$ model according the embodiment of the present invention. When the sets of historical process and metrology data are normal and sufficient, step 150 can be performed. In step 150, step 152 is first performed for constructing the first $DQI_x$ model, and the method thereof is described as follows.

Assume that n sets of historical process data are received in step 140 for constructing the first $DQI_x$ model, wherein each set of historical process data is composed of p parameters. These n sets of historical process data are applied to generate p eigenvectors with p corresponding eigenvalues ($\lambda_1 \geq \lambda_2 \geq \ldots \geq \lambda_p$) in descending order by the principal component analysis (PCA). Then, a set of k significant eigenvalues (with $\lambda \geq 1$) is selected for constructing a feature-extraction matrix M, which is expressed as:

$$M = \begin{bmatrix} [\text{eigenvector } 1] \\ [\text{eigenvector } 2] \\ \vdots \\ [\text{eigenvector } k] \end{bmatrix}_{k*p} \quad (27)$$

The method for computing the $DQI_x$ value is explained as follows.

At first, equation (28) is applied to transform the $i^{th}$ input set of process data $X_i$ to k data feature variables $A_i=[a_1, a_2, \ldots, a_k]$.

$$A_i = M \cdot X_i \quad (28)$$

Then, these k data feature variables are transformed to $Z_A = [z_{a_1}, z_{a_2}, \ldots, z_{a_k}]$, which is then converted by the Euclidean distance (ED) algorithm into a consolidated index, i.e. $DQI_x$ value:

$$DQI_{X_i} = \sqrt{\sum_{j=1}^{k} (z_{a_{i,j}} - \bar{z}_{a_j}) * (z_{a_{i,j}} - \bar{z}_{a_j})^T} \quad (29)$$

where i represents the $i^{th}$ input set of process data;
$\bar{z}_{a_j}$: the mean of the j-th standardized variable of the training samples.

Theoretically, the value of $\bar{z}_{a_j}$ is zero, and therefore Equation (29) can be simplified as:

$$DQI_{X_i} = \sqrt{\sum_{j=1}^{k} (z_{a_{i,j}}) * (z_{a_{i,j}})^T} \quad (30)$$

Meanwhile, the cross validation's leave-one-out (LOO) method is used to determine process data quality threshold ($DQI_{x_T}$) as:

$$DQI_{x_T} = a * \overline{DQI}_{x_{LOO}} \quad (31)$$

In the so-called cross validation's leave-one-out (LOO) method, one sample data set is selected from all sets of process data used for building models as a simulated on-line test sample set, and then the remaining sets of historical process data are utilized to construct a $DQI_x$ model, and thereafter the $DQI_x$ model newly built is used to compute a $DQI_x$ value for the simulated on-line test sample set, i.e. $DQI_{x_{LOO}}$. The above steps are repeated on all of the sample data sets (process data) used for building models, thus computing all of the $DQI_{x_{LOO}}$ values of the respective sample data sets. Therefore, $\overline{DQI}_{x_{LOO}}$ shown in equation (31) stands for, for example, the 90% trimmed mean of all the $DQI_{x_{LOO}}$ values computed by the sample data sets respectively. The "a" shown in equation (31) is between 2 and 3, and can be slightly adjusted in accordance with the actual conditions, wherein "a" is predetermined to be 3.

It is noted that the feature-extraction matrix M and the $DQI_x$ compose a $DQI_x$ model, and the $DQI_x$ model will be updated (in the model-refreshing procedure) in accordance with a condition for retraining or tuning.

After step 152 is completed, step 154 is performed for computing Z-score values of the historical process data. Then, step 156 is performed for creating the first $DQI_y$ model. The $DQI_y$ model is composed of m similar patterns. In the present embodiment, the m similar patterns $\{P_1, P_2, \ldots, P_m\}$ are sorted from Z-score values of those n sets of historical process data by applying adaptive resonance theory 2 (ART2) with $\rho=0.98$.

The method for computing the $DQI_y$ values is described as follows.

At first, when a new actual measurement value $y_j$ is collected, the Z-score value $Z_{x_{Gj}}$ corresponding to the actual measurement value $y_j$ are applied by the adaptive resonance theory 2 (ART2) to search for the most similar pattern $P_q = [X_{q,1}, X_{q,2}, \ldots, X_{q,v}]$ from the similar patterns $\{P_1, P_2, \ldots, P_m\}$. Then, the v samples ($v \geq 2$) inside the $P_q = [X_{q,1}, X_{q,2}, \ldots, X_{q,v}]$ with their corresponding actual measurement values, $Y_q = [y_{q,1}, y_{q,2}, \ldots, y_{q,v}]$, and this new actual measurement value $y_j$ are utilized to compute the $DQI_{y_j}$ and the threshold value ($DQI_{y_T}$) of the $DQI_y$.

The $DQI_{y_j}$ of $y_j$ is obtained as normalized variability (NV):

$$DQI_{y_j} = \frac{|y_j - \overline{y}_q|}{\overline{y}_q} \quad (32)$$

where $$\overline{y}_q = \frac{1}{v}\sum_{l=1}^{v} y_{q,l} \quad (33)$$

where $\overline{y}_q$: the mean of all $y_{q,l}$ in $Y_q$;
v: the number of samples inside the pattern $P_q$.

The $DQI_{y_T}$ of a certain pattern $P_q$ is defined to be the maximal-tolerable variance of the $P_q$. Suppose that $y_t$ is the maximal-tolerable metrology value that possesses the maximal-tolerable variance in $P_q$, then $y_t$ can be presented as:

$$y_t = \overline{y}_q + R_{max} \text{ or } y_t = \overline{y}_q - R_{max} \quad (34)$$

where $R_{max}$ is the maximal-tolerable variance;

$$R_{max} = \max(R_{P_1}, R_{P_2}, \ldots, R_{P_m}) \quad (35)$$

where $R_{P_i}$, $i=1, 2, \ldots, m$, is the range in pattern $P_i$, and m is the total number of all the similar-pattern groups.

By adding $y_t$ into the similar pattern $P_q$, the $DQI_{y_T}$ can be acquired as:

$$DQI_{y_T} = \frac{|y_t - \overline{y}_q|}{\overline{y}_q} \quad (36)$$

After obtaining the $DQI_{y_j}$ and $DQI_{y_T}$, if $DQI_{y_j} > DQI_{y_T}$ is true, then it means that the new actual measurement value is abnormal; otherwise, the new actual measurement value is normal.

The aforementioned PCA, LOO, ART2, Z-score and ED algorithms all are known to one having ordinary skill in the art, and thus the details thereof are not described herein.

Thereafter, such as shown in FIG. 6A, step 160 is performed for data reduction, wherein data-reduction rules are executed to select key parameters needed for building the conjecture model, the RI model and the GSI model. Then, the selected key parameters are applied to construct the first set of conjecture model, RI model and GSI model (step 170), wherein the conjecture model is used to compute a virtual metrology value of a workpiece; the RI model comprises a reference prediction model used to generate a reference prediction value and a reliance index of the virtual metrology value for the workpiece; and the GSI model is used to compute a global similarity index of the process data used for producing the workpiece. The algorithm used by the reference prediction model in the RI model is different from that by the conjecture model, for example, the conjecture model uses a neural network (NN) algorithm, and the reference prediction model uses a multi-regression (MR) algorithm. Thus the (VM) conjecture value and the reference prediction value together with the GSI value can be applied to set up model-refreshing conditions for determining whether the model refreshing procedure is completed. For setting up the model-refreshing conditions, step 170 has to compute a refreshing threshold of VM conjecture, a refreshing threshold of reference prediction and a refreshing threshold of GSI. The principles of these refreshing thresholds are described as follows.

According to the cross validation's leave-one-out (LOO) method, one set of sample data is selected from all the sets of sample data (historical process data) for building models as a simulated on-line test sample set, and the remaining sets of sample data are used to construct a set of prediction models (including a conjecture model, a reference prediction model and a GSI model), and also to obtain a conjecture error ($E_N$), a reference prediction error ($E_M$) and a $GSI_{LOO}$ value of the test sample set. Then, the above steps are repeated with respect to each of the sets of sample data until all of the conjecture errors ($E_N$), reference prediction errors ($E_M$) and $GSI_{LOO}$ values corresponding to the sets of sample data are acquired, and then the maximum (Max) and minimum (Min) values of the conjecture errors ($E_N$), and the maximum (Max) and minimum (Min) values of the reference prediction errors ($E_M$) are obtained, wherein the maximum and minimum values of $E_N/E_M$ represent the worst and best conjecture/prediction accuracy of the conjecture and reference prediction models, and a refreshing threshold of GSI are related to all of the $GSI_{LOO}$ values. Hence, a refreshing threshold of VM conjecture ($NN_{RT}$; let the conjecture use the NN algorithm) and a refreshing threshold of reference prediction ($MR_{RT}$; let the reference prediction use the MR algorithm) are computed as follows.

$$NN_{RT} = \frac{\text{Max}(E_N) + \text{Min}(E_N)}{2} \quad (37)$$

$$MR_{RT} = \frac{\text{Max}(E_M) + \text{Min}(E_M)}{2} \quad (38)$$

where $NN_{RT}$: refreshing threshold of VM conjecture
$MR_{RT}$: refreshing threshold of reference prediction;
Max($E_N$): the maximum value of ($E_{Ni}$, i=1, 2, ..., n);
Min($E_N$): the minimum value of ($E_{Ni}$, i=1, 2, ..., n);
Max($E_M$): the maximum value of ($E_{Mi}$, i=1, 2, ..., n);
Min($E_M$): the minimum value of ($E_{Mi}$, i=1, 2, ..., n);
  n: the number of the sets of sample data for building models.

A refreshing threshold ($GSI_{RT}$) of GSI is computed as follows.

$$GSI_{RT} = a * \overline{GSI}_{LOO} \quad (39)$$

The definition of equation (39) for $GSI_{RT}$ is the same as that of equation (26) for $GSI_T$, wherein $\overline{GSI}_{LOO}$ stands for, for example, the 90% trimmed mean of the $GSI_{LOO}$ values of all of the sets of sample data for building models. The "a" shown in equation (39) is between 2 and 3, and can be slightly adjusted in accordance with the actual conditions, wherein "a" is predetermined to be 3.

Model-Refreshing Step with Dual-Phase VM Algorithm

The dual-phase VM algorithm of the present embodiment has the following two features: (1) adding $DQI_x$ model and $DQI_y$ model to automatically evaluate the quality of process and metrology data; (2) adding the automatic model-refreshing mechanism for saving time and manpower for deploying virtual metrology into the respective process chambers of the same equipment or the same type of equipment with maintaining the desirable VM accuracy.

Figure 7A:
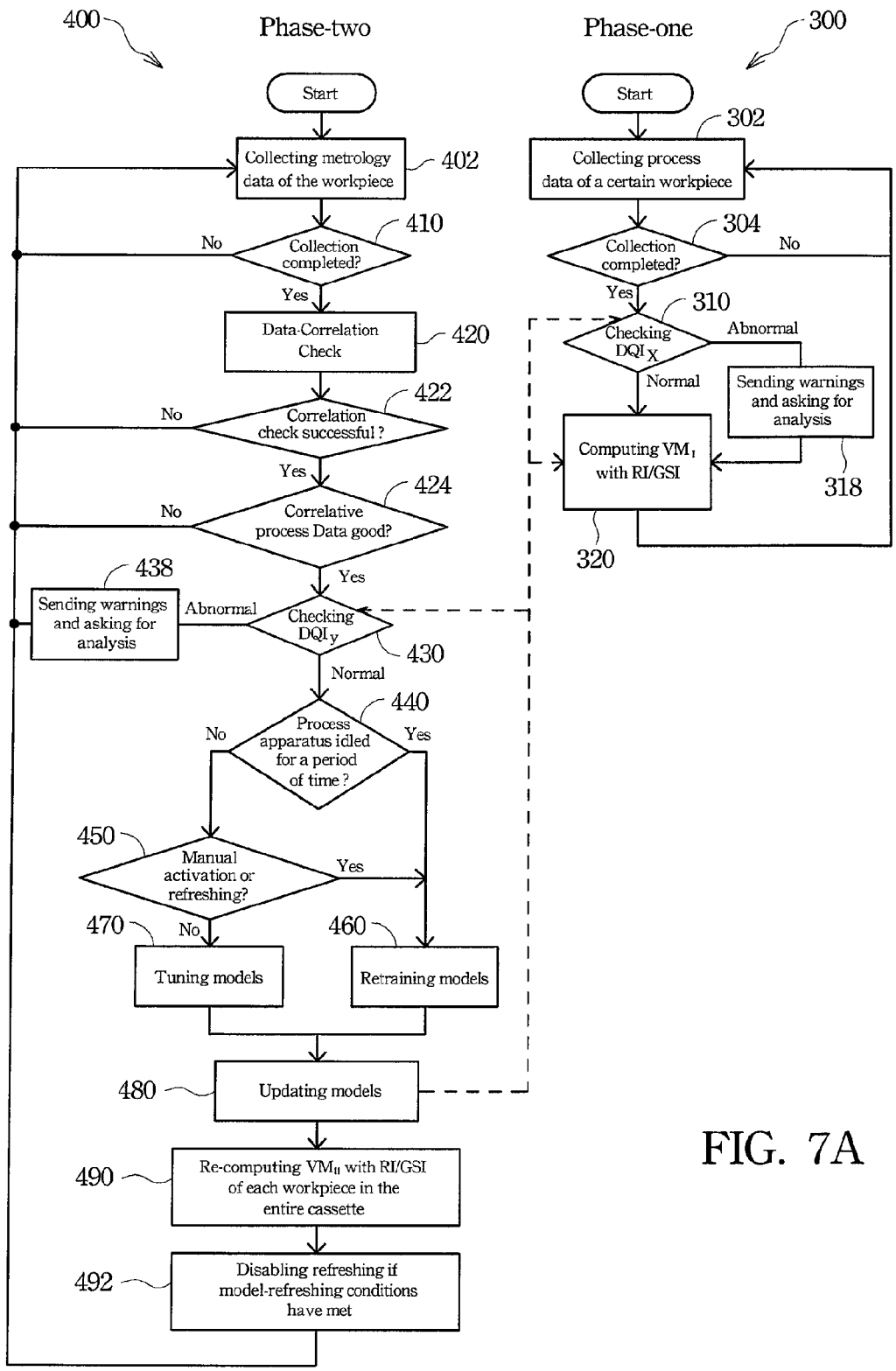
FIG. 7A is a schematic flow chart showing the model-refreshing step with the dual-phase VM algorithm according to the embodiment of the present invention.
Figure 7B:
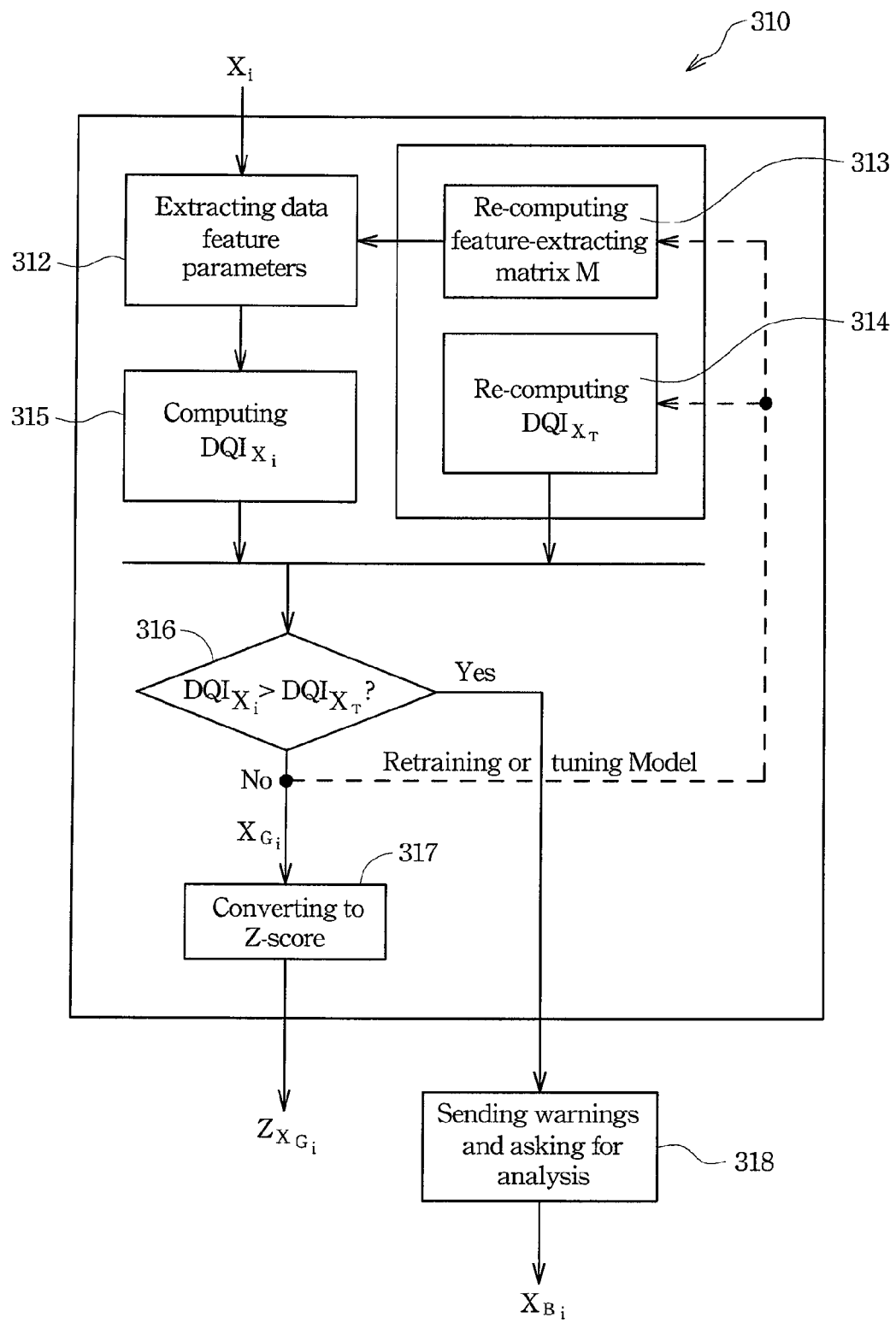
FIG. 7B is a schematic flow chart showing the step for checking the $DQI_x$ value according to the embodiment of the present invention.

Referring to FIG. 7A, FIG. 7A is a schematic flow chart showing the model-refreshing step with the dual-phase VM algorithm according to the embodiment of the present invention. After the aforementioned model-creation step is completed, a set of first VM models (the first set of VM models) is built by using a plurality of sets of historical process data and a plurality of historical measurement values, wherein the set of first VM models comprises a conjecture model built in accordance with a conjecture algorithm such as a neural network (NN) algorithm, a multi-regression (MR) algorithm, a support vector machines (SVM) algorithm or any other prediction algorithm. In a phase-one VM step 300, at first, step 302 is performed for collecting process data of a certain workpiece from a process apparatus. Then, step 304 is performed for checking if the collection of the process data of the certain workpiece is completed. When the result of step 304 is false (i.e. "No"), step 302 is continuously performed; and, when the result of step 304 is true (i.e. "Yes"), step 310 is performed for checking or evaluating the $DQI_x$ value of the process data of the certain workpiece. Referring to FIG. 7A and FIG. 7B, FIG. 7B is a schematic flow chart showing the step for checking the $DQI_x$ value according to the embodiment of the present invention. In step 310, after the first $DQI_x$ model (including feature-extraction matrix M and process data quality threshold ($DQI_{x_T}$)), step 312 is first performed for extracting data feature variables $A_i = [a_1, a_2, \ldots, a_k]$ of the process data ($X_i$) of the certain workpiece. Then, step 315 is performed for computing the $DQI_{x_i}$ value of the process data ($X_i$). Thereafter, step 316 is performed for checking if the $DQI_{x_i}$ is greater than $DQI_{x_T}$. When the result of step 316 is true (i.e. "Yes"), it means that the process data are abnormal data ($X_{B_j}$), and step 318 is performed for sending warnings and asking for data analysis. When the result of step 316 is false (i.e. "No"), it means that the process data are normal data ($X_{G_j}$), and step 317 is performed for converting the normal data ($X_{G_j}$) to Z-score data ($Z_{x_{G_j}}$). Besides, if the $DQI_x$ model is requested to be retrained or tuned, step 313 is preformed for using the normal process data ($X_{G_j}$) to replace the oldest data of the process data currently used for building models so as to re-compute the feature-extraction matrix M; and step 314 is performed to re-compute the process data quality threshold ($DQI_{x_T}$) for use in step 312 of the next workpiece.

Regardless of normal process data (the result of step 316 is false) or abnormal process data, step 320 (in FIG. 7A) is always performed for computing a virtual metrology value for the certain workpiece and its accompanying reliance index and global similarity index, i.e. a phase-one VM value ($VM_I$) with its RI&GSI.

In a phase-two VM step 400, step 402 is performed for collecting an actual measurement value (metrology data) of the certain workpiece. Thereafter, step 410 is performed for checking if the collection of the actual measurement value is completed. When the result of step 410 is false (i.e. "No"), step 402 is continuously performed; and, when the result of step 410 is true (i.e. "Yes"), a data-correlation check step 420 is performed for checking if there exists the process data corresponding to the actual measurement value of the certain workpiece. Then, step 422 is performed for determining if the data-correlation check is successful. When the result of step 422 is false (i.e. "No"), step 402 is continuously performed; and, when the result of step 422 is true (i.e. "Yes"), step 424 is performed for determining if the correlated process data are normal by evaluating the $DQI_x$ value of the process data obtained in the phase-one VM step 300. When the result of step 424 is false (i.e. "No"), step 402 is continuously performed; and, when the result of step 424 is true (i.e. "Yes"), step 430 is performed for checking or evaluating a $DQI_y$ value of the actual measurement value of the certain workpiece, so as to determine if the actual measurement value is normal.

Figure 7C:
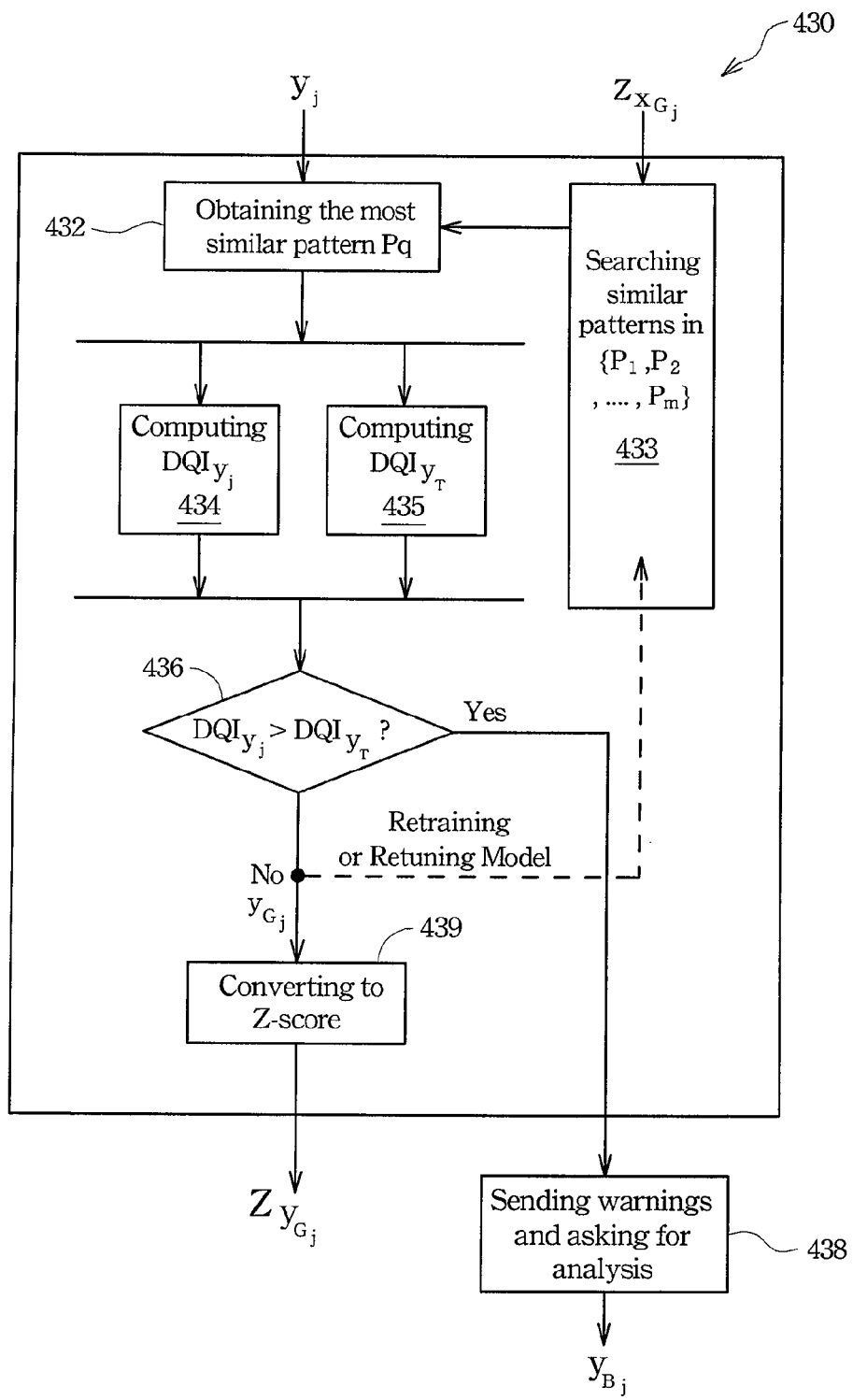
FIG. 7C is a schematic flow chart showing the step for checking the $DQI_y$ value according to the embodiment of the present invention.

Referring to FIG. 7A and FIG. 7C, FIG. 7C is a schematic flow chart showing the step for checking the $DQI_y$ value according to the embodiment of the present invention. In step 430, at first, steps 433 and 432 are performed for searching for a pattern $P_q$ which is the most similar to the Z-score value $Z_{x_{Gj}}$ corresponding to the actual measurement value $y_j$ from the similar patterns $\{P_1, P_2, \ldots, P_m\}$, which is the so-called $DQI_y$ model. Then, step 434 is performed for computing $DQI_{y_j}$; and step 435 is performed for computing $DQI_{y_T}$. And then, step 436 is performed for checking if the $DQI_{y_j}$ is greater than $DQI_{y_T}$. When the result of step 436 is true (i.e. "Yes"), it means that the actual measurement value is an abnormal datum ($y_{B_j}$), and step 438 is performed for sending warnings and asking for data analysis. When the result of step 436 is false (i.e. "No"), it means that the actual measurement value is a normal datum ($y_{G_j}$), and step 439 is performed for converting the normal datum ($y_{G_j}$) to Z-score data ($Z_{y_{G_j}}$) for use in building models. Besides, if the $DQI_y$ model is requested to be retrained or tuned, step 433 is preformed for using the normal datum ($y_{G_j}$) and its corresponding Z-score data ($Z_{x_{Gj}}$) of the process data to replace the oldest data of the process data and actual measurement values currently used for building models so as to re-search and obtain the most similar pattern in step 432 for the next workpiece. When the result of step 436 is true (i.e. the result of step 430 is abnormal), step 438 is performed for sending warnings and asking for data analysis.

When the result of step 430 is normal, a retraining-deciding step 440 (in FIG. 7A) is performed for determining if the process apparatus has been idled for a predetermined period of time. When the result of step 440 is true (i.e. "Yes"), step 460 is performed for retraining the VM models. When the result of step 440 is false (i.e. "No"), another retraining-deciding step 450 is performed for checking if there exists an instruction of manual activation or an instruction of model refreshing. The instruction of model refreshing is used in a model-refreshing procedure, and is set to "yes" initially, i.e. when a newly-ported set of models is in operation, the model-refreshing procedure has to be entered for retraining the newly-ported set of models. When the result of step 450 is true (i.e. "Yes"), step 460 is performed for retraining the VM models. When the result of step 450 is false (i.e. "No"), step 470 is performed for tuning the conjecture model, the RI model, the GSI model, the $DQI_x$ model and the $DQI_y$ model. Before the retraining or tuning step is performed, the newly-collected process data and actual measurement value are adopted to replace the oldest data in the historical process data and actual measurement value. The so-called tuning is based on a set of process data and actual measurement value currently obtained for the selected workpiece to adjust the weighting values or parameter values of the respective models, and it only takes several seconds to complete the tuning. The so-called retraining is to use the updated historical process data and actual measurement values (historical metrology data) to rebuild the VM models, and it normally takes several minutes to complete the retraining.

After steps 460 and 470 are completed, a model-updating step 480 is performed for replacing the whole set of old VM models by the newly-retrained or tuned set of VM models including a conjecture model, a RI Model, a GSI model, a $DQI_x$ model and a $DQI_y$ model. These new set of VM models is also provided to steps 310, 320 and 430 for evaluating the $DQI_x$ value of the process data corresponding to the next workpiece and computing a phase-one VM value ($VM_I$) of the next workpiece and its accompanying RI and GSI; and for evaluating the $DQI_y$ value of the actual measurement value of the next workpiece. Meanwhile, step 490 is performed for using the new set of VM models to re-compute the virtual metrology value and its accompanying RI and GSI, i.e. a phase-two virtual metrology value ($VM_{II}$) with its RIIGSI, for each workpiece in the entire cassette to which the certain workpiece belongs, wherein the cassette can be a virtual cassette or a physical cassette. Thereafter, step 492 is performed for determining whether model-refreshing conditions are achieved. When the model-refreshing conditions are achieved, the instruction of model refreshing will be cancelled, i.e. set to "No", meaning the set of VM models need not to be refreshed anymore. The model-refreshing conditions of the present embodiment are explained in the following.

At first, the instruction of model refreshing is "Yes", the certain workpiece and several consecutive workpieces entering the process apparatus before and/or after the certain workpiece are defined as a plurality of consecutive refreshing samples (for example: 3 consecutive refreshing samples). If the following three conditions are met at the same time, the model-refreshing conditions of the present embodiment are deemed achieved, and the instruction of model refreshing is set to "No", meaning that the whole set of VM models after the model-refreshing procedure has satisfactory conjecture and prediction accuracy, and is ready to provide VM service; otherwise, the model-refreshing procedure has to be executed continuously. The three conditions are described as follows.

(1) A first model-refreshing condition is defined as: the mean absolute percentage error (MAPE) values of the phase-one VM values of these consecutive refreshing samples are smaller than the refreshing threshold ($NN_{RT}$) of VM conjecture.

(2) A second model-refreshing condition is defined as follows: the MAPE values of the phase-one reference prediction values of these consecutive refreshing samples are smaller than the refreshing threshold ($MR_{RT}$) of reference prediction.

(3) A third model-refreshing condition is defined as follows: the phase-one GSI values of these consecutive refreshing samples are smaller than the refreshing threshold ($GSI_{RT}$) of GSI. Then, a determination result is obtained by determining if all of the first, second and third model-refreshing conditions are met simultaneously, wherein the instruction of model refreshing will be set to "no" if the determination result is true ("yes"), otherwise the instruction of model refreshing will remain as "yes".

Hence, If the process apparatus has been idled for a predetermined period of time (step 440); or there exists an instruction of manual activation or an instruction of model refreshing (step 450), the retraining step 460 is performed; otherwise, the tuning step 470 is performed.

Figure 8:
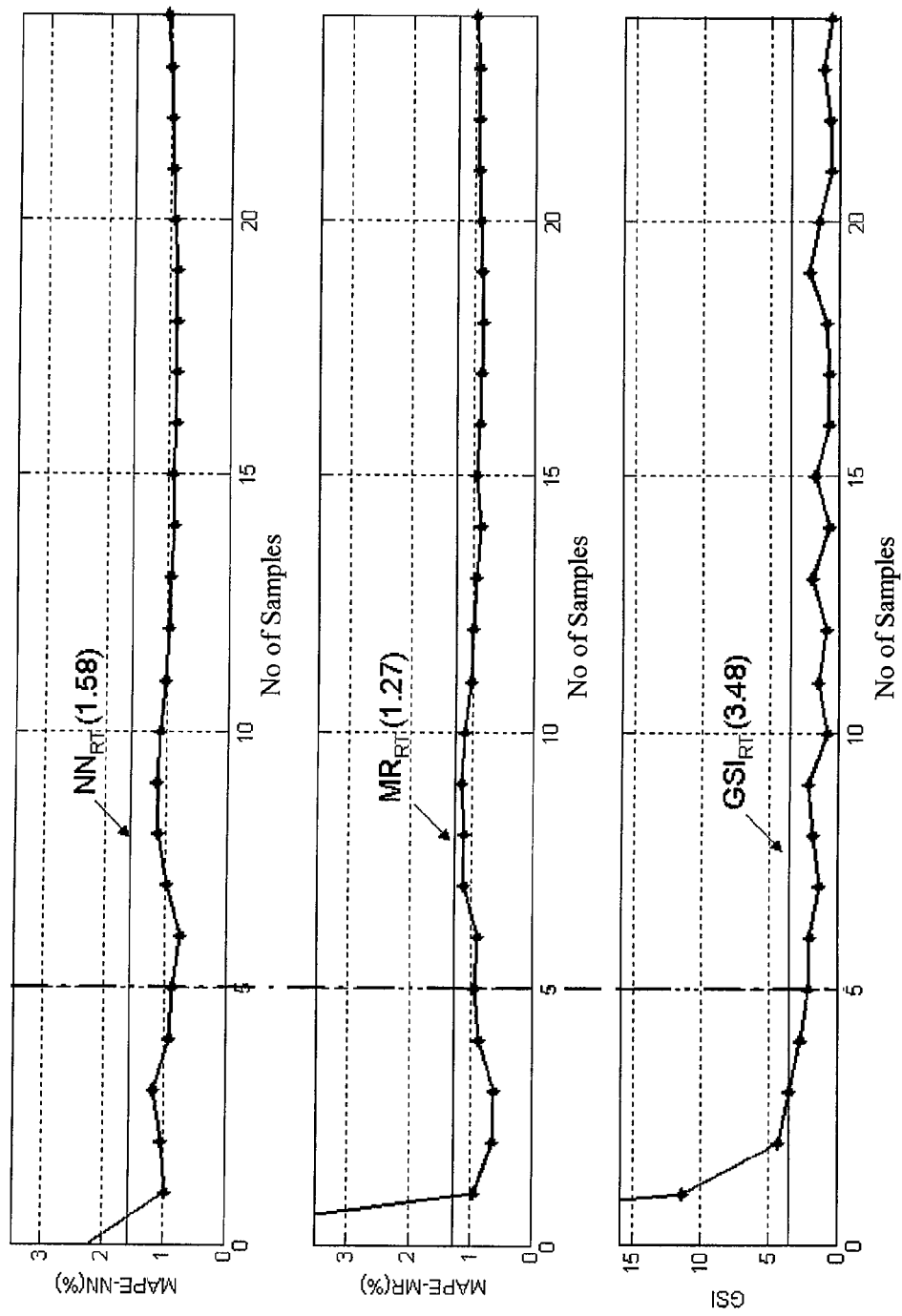
FIG. 8 shows the results of applying the embodiment of the present invention to a CVD (Chemical Vapor Deposition) machine.

Hereinafter, an application example is described for explaining the advantages of the present embodiment. Referring to FIG. 8, FIG. 8 shows the results of applying the embodiment of the present invention to a CVD (Chemical Vapor Deposition) machine, wherein the CVD machine is composed of 6 process chambers A-F. In this application example, the chamber A is selected for creating the first set of VM models, and are fanned out or ported to the chamber F, and then the AVM server of the chamber F executes a model-refreshing procedure for retraining the first set of VM models. In this application example, 60 sets of historical process data are collected from the process chamber A, and 24 samples from the process chamber F are used to evaluate the results of model refreshing as shown in FIG. 8. In this application example, the conjecture model is built in accordance with a neural network (NN) algorithm, and the reference prediction module is built in accordance with a multi-regression (MR) algorithm. Such as shown in FIG. 8, at sample 0, the mean absolute percentage error values (MAPE-NN) of the phase-one VM value, the mean absolute percentage error value (MAPE-MR) of the phase-one VM reference prediction value, and the GSI value with respect to the process chamber F are obtained by using the first set of un-retrained VM models based on the process chamber A. Apparently, the MAPE-NN and MAPE-MR of sample 0 are too high, which is due to feature difference between the process chamber A and the process chamber F, wherein the feature difference can be known from the extremely high GSI value at sample 0. However, at sample 1, since the first set of VM models has been re-trained once, its MAPE-NN and MAPE-MR are much lowered, and its GSI value is also moderated a lot, and thus it can be known that the retraining step (model-refreshing procedure) used in the embodiment of the present invention is effective. The $NN_{RT}$, $MR_{RT}$ and $GSI_{RT}$ of this application example are 1.58, 1.27 and 3.48 respectively. It can be known from FIG. 8 that, at samples 1-3 (three consecutive points), the first and second model-refreshing conditions have been satisfied, but the third model-refreshing condition has not. Hence, the model-refreshing procedure continues. At samples 3-5, the first, second and third model-refreshing conditions are satisfied simultaneously, meaning that the model-refreshing procedure for the process chamber F has been completed, and the set of VM models used for the process chamber F has satisfactory accuracy, and is ready for providing all the VM related services.

It can be known from the preferred embodiment of the present invention that: the present invention can save enormous time and effort for deploying virtual metrology into each process chamber of the same equipment or the same type of equipment with maintaining the satisfactory accuracy of the virtual metrology; and automatically evaluating and sifting the process data and actual metrology data (measurement values), thus efficiently satisfying the requirements of deploying virtual metrology into the whole plant.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A system for automatic virtual metrology (AVM), comprising:
    a first process apparatus having a plurality of sets of historical process data and a set of first process data, wherein said first process apparatus produces a first workpiece in accordance with said set of first process data;
    first metrology equipment having a plurality of historical measurement values and a first actual measurement value of said first workpiece, wherein said historical measurement values are actual metrology data of the workpieces respectively produced by using said sets of historical process data;
    a first AVM server used for collecting said sets of historical process data and said historical measurement values;
    a model-creation server used for building a set of VM (Virtual Metrology) models by using said sets of historical process data and said historical measurement values;
    a second process apparatus used for producing a second workpiece in accordance with a set of second process data;
    second metrology equipment used for measuring a second actual measurement value of said second workpiece; and
    a second AVM server used for conducting virtual metrology on said second workpiece by using said set of VM models, wherein said second AVM server is used for retraining or tuning said set of VM models therein by using said set of second process data and said second actual measurement value to replace the oldest data in said sets of historical process data and said historical measurement value.

2. The system as claimed in claim 1, wherein said first AVM server uses said set of VM models to conduct virtual metrology on said first workpiece.

3. The system as claimed in claim 2, wherein said set of VM models comprises:
    a conjecture model used for generating a first VM value of said first workpiece or a second VM value of said second workpiece, wherein said conjecture model is built in accordance with a conjecture algorithm, and said conjecture algorithm is a neural network (NN) algorithm, a multi-regression (MR) algorithm or a support vector machines (SVM) algorithm;
    a RI (Reliance Index) model used for generating respective RI values of said first VM value and said second VM value, wherein said RI model is built in accordance with a reference algorithm, and said reference algorithm is different from said conjecture algorithm and is a multi-regression algorithm, a neural network algorithm, or a SVM algorithm;
    a GSI (Global Similarity Index) model used for computing respective GSI values for said set of first process data and said set of second process data, wherein the GSI model is built in accordance with a Mahalanobis distance algorithm;
    a $DQI_x$ (Process Data Quality Index) model used for computing respective $DQI_x$ values for said set of first process data and said set of second process data, wherein said $DQI_x$ model is built in accordance with a principal component analysis (PCA) and a Euclidean distance (ED) algorithm; and
    a $DQI_y$ (Metrology Data Quality Index) model used for computing $DQI_y$ values for said first actual measurement value and said second actual measurement value, wherein said $DQI_y$ model is built in accordance with adaptive resonance theory 2 (ART2) and normalized variability (NV).

4. The system as claimed in claim 3, wherein said first AVM server comprises:
    a control kernel used for monitoring the states of respective modules in said first AVM server, and controlling the operation procedure of each module in accordance with a dual-phase virtual metrology algorithm;
    a data pre-processing module used for evaluating the quality of said set of first process data and said first actual measurement value by using said $DQI_x$ model and said $DQI_y$ model;
    a pluggable driver interface (PDI);
    a data collection driver connected to said PDI for collecting said set of historical process, said historical measurement values, said set of first process data and said first actual measurement value, wherein the process data and measurement values collected are provided to said data pre-processing module via said PDI;
    a pluggable application interface (PAI);
    a VM-models storage module connected to the PAI for storing said set of VM models;
    a pluggable communication interface (PCI); and
    a communication agent connected to said PCI for communicating with said model-creation server.

5. The system as claimed in claim 3, wherein said second AVM server comprises:
    a control kernel used for monitoring the stats of respective modules in said second AVM server, and controlling the operation procedure of each module in accordance with a dual-phase virtual metrology algorithm;
    a data pre-processing module used for evaluating the quality of said set of second process data and said second actual measurement value by using said $DQI_x$ model and said $DQI_y$ model;
    a pluggable driver interface (PDI);
    a data collection driver connected to said PDI for collecting said set of second process data and said second actual measurement value, wherein the process data and measurement values collected are provided to said data pre-processing module via said PDI;
    a pluggable application interface (PAI);
    a VM-models storage module connected to the PAI for storing said set of VM models;
    a pluggable communication interface (PCI); and
    a communication agent connected to said PCI for communicating with said model-creation server.

6. The system as claimed in claim 2, wherein said first AVM server is used for retraining or tuning said set of VM models therein by using said set of first process data and said first actual measurement value to replace the oldest data in said sets of historical process data and said historical measurement value.

7. The system as claimed in claim 1, wherein said first process apparatus and said second process apparatus are of the same type.

8. A method for automatic virtual metrology (AVM), comprising:

performing a model-creation step for building a set of first VM models by using a plurality of historical measurement values and a plurality of sets of historical process data corresponding to said historical measurement values, wherein said set of first VM models comprises:

a conjecture model built in accordance with a conjecture algorithm, wherein said conjecture algorithm is a neural network (NN) algorithm, a multi-regression (MR) algorithm or a support vector machines (SVM) algorithm;

collecting a set of first process data of a workpiece from a process apparatus;

after the collection of said set first process data of said workpiece from said process apparatus is completed, performing a phase-one VM step, wherein said phase-one VM step comprises:

performing a phase-one VM computation step for computing a phase-one VM value ($VM_I$) of said workpiece by inputting said set of first process data to said set of first VM models; and performing a phase-two VM step when a first actual measurement value of said workpiece is obtained, said phase-two VM step comprising:

performing a retraining-deciding step for determining if a retraining step is performed, wherein said retraining step is performed when an instruction of model refreshing is true, said retraining step comprising:

retraining or tuning a set of second VM models by using said set of first process data and said first actual measurement value to replace the oldest data in said sets of historical process data and said historical measurement value, wherein the model types and their building methods are the same for said set of first VM models and said set of second VM models; and replacing said set of first VM models by said set of second VM models to compute another phase-one VM value for another workpiece entering said process apparatus subsequently.

9. The method as claimed in claim 8, wherein said instruction of model refreshing is set to true initially.

10. The method as claimed in claim 8, wherein said set of first VM models further comprises:

a RI model for generating the reliant index of said VM values, wherein said RI model includes a reference prediction model, wherein said reference prediction model is built in accordance with a reference algorithm, and said reference algorithm is different from said conjecture algorithm and is a multi-regression algorithm, a neural network algorithm, or a SVM algorithm; and a GSI model used for computing a GSI value for said set of first process data, wherein said GSI model is built in accordance with a Mahalanobis distance algorithm;

said model-creation step further comprises:

applying said sets of historical process data and historical actual measurement values in accordance with a cross validation's leave-one-out (LOO) method, to rebuild said conjecture model, said reference prediction model and said GSI model, and to compute respective VM conjecture errors, reference prediction errors and GSI values for each of said sets of historical process data, thereby computing a refreshing threshold of VM conjecture, a refreshing threshold of reference prediction and a refreshing threshold of GSI;

said phase-one VM computation step further comprises:

inputting said set of first process data to said reference prediction model and said GSI model in said set of first VM models, thereby computing a phase-one reference prediction value and a phase-one GSI value of said workpiece; and said phase-two VM step further comprises:

when said instruction of model refreshing is true, defining said workpiece and several consecutive workpieces entering said process apparatus before and/or after said workpiece as a plurality of consecutive refreshing samples;

defining a first model-refreshing condition representing that the mean absolute percentage error (MAPE) values of the phase-one VM values of said consecutive refreshing samples are smaller than said refreshing threshold of VM conjecture;

defining a second model-refreshing condition representing that the MAPE values of the phase-one reference prediction values of said consecutive refreshing samples are smaller than said refreshing threshold of reference prediction;

defining a third model-refreshing condition representing that the phase-one GSI values of said consecutive refreshing samples are smaller than said refreshing threshold of GSI; and determining if all of said first model-refreshing condition, said second model-refreshing condition and said third model-refreshing condition are met simultaneously, thereby obtaining a determination result, wherein said instruction of model refreshing is set to false when said determination result is true, otherwise said instruction of model refreshing is true.

11. The method as claimed in claim 10, wherein said consecutive refreshing samples include three consecutive refreshing samples.

12. The method as claimed in claim 8, wherein said model-creation step further comprises:

collecting said sets of historical process data from a process apparatus; and collecting said historical measurement values from metrology equipment, wherein said historical process data and said historical measurement values are correlated to the same workpieces.

13. The method as claimed in claim 8, wherein said phase-two VM step further comprises:

applying said sets of second VM models to compute respective phase-two virtual metrology values ($VM_{II}$) for all of the workpieces in a cassette to which said workpiece belongs.

14. The method as claimed in claim 13, wherein said set of first VM models further comprises:

a RI Model for calculating an overlap area between a statistical distribution of a VM value and a statistical distribution of a corresponding reference prediction value, thereby generating the RI value of said VM value, wherein the RI value is higher when the overlap area is larger, representing that the reliance level of said VM value corresponding to the RI value is higher, wherein a reference prediction model is built in accordance with a reference algorithm, and said reference algorithm is different from said conjecture algorithm and is a multi-regression algorithm, a neural network algorithm, or a SVM algorithm;

wherein said phase-one VM step further comprises: using said RI model to compute the RI value of said phase-one VM value; and wherein said phase-two VM step further comprises: using said RI model to compute the RI values of said phase-two VM values.

15. The method as claimed in claim 8, wherein said set of first VM models further comprises:

a $DQI_x$ model used for computing a $DQI_x$ value for said set of first process data, wherein said $DQI_x$ model is built in accordance with a principal component analysis (PCA) and a Euclidean distance (ED) algorithm; and a $DQI_y$ model used for computing a $DQI_y$ value for said first actual measurement value, wherein said $DQI_y$ model is built in accordance with adaptive resonance theory 2 (ART2) and normalized variability (NV);

said model-creation step further comprises:

applying said sets of historical process data to said $DQI_x$ model in accordance with a cross validation's leave-one-out (LOO) method, to compute a first process data quality threshold ($DQI_{x_T}$);

applying said sets of historical process data and historical actual measurement values to said $DQI_y$ model in accordance with concepts of maximal-tolerable variance, to compute a first metrology data quality threshold ($DQI_{y_T}$);

said phase-one VM step further comprises:

prior to said phase-one VM computation step, inputting said set of first process data into said $DQI_x$ model to compute a first $DQI_x$ value of said workpiece; and checking if said first $DQI_x$ value is greater than said first process data quality threshold, thereby obtaining a first checking result, wherein when said first checking result is false, said phase-one VM computation step is performed;

said phase-two VM step further comprises:

prior to said retraining-deciding step, inputting said first actual measurement value into said $DQI_y$ model to compute a first $DQI_y$ value of said workpiece; and checking if said first $DQI_y$ value is greater than said first metrology data quality threshold, thereby obtaining a second checking result, wherein when said second checking result is false, said retraining-deciding step is performed.

16. A method for automatic virtual metrology (AVM), comprising:

instructing a first AVM server, by a model-creation server, to collect a plurality of historical measurement values and a plurality of sets of historical process data corresponding to historical measurement values required for building models;

connecting said first AVM server to first metrology equipment for collecting said historical measurement values, and connecting said first AVM server to a first process apparatus for collecting said sets of historical process data;

checking correlations between said sets of historical process data and said historical actual measurement values by said first AVM server;

sending all of successfully-correlated measurement values and process data to said model-creation server by said first AVM server;

performing a data-preprocessing step on the data required for building models by said model-creation server, thereby removing abnormal historical process data and historical measurement values;

creating a $DQI_x$ model and a $DQI_y$ model by said model-creation server, wherein said $DQI_x$ model is used for computing respective $DQI_x$ values for the sets of process data producing workpieces, and said $DQI_x$ model is built in accordance with a principal component analysis (PCA) and a Euclidean distance (ED) algorithm; said $DQI_y$ model is used for computing a $DQI_y$ value for said first actual measurement value, wherein said $DQI_y$ model is built in accordance with adaptive resonance theory 2 (ART2) and normalized variability (NV);

applying said $DQI_x$ model and said $DQI_y$ model to perform a data-sifting step by said model-creation server, thereby selecting enough correlated historical process data and historical measurement values needed for building models;

applying the correlated historical process data and historical measurement values, by said model-creation server, to create a set of first VM models, said set of first VM models comprising: said $DQI_x$ model, said $DQI_y$ model, a conjecture model, a RI model and a GSI model, wherein said conjecture model is built in accordance with a conjecture algorithm, wherein said conjecture algorithm is a neural network (NN) algorithm, a multi-regression (MR) algorithm or a support vector machines (SVM) algorithm; a RI model including a reference prediction model for generating respective RI indexes for workpieces, wherein said reference prediction model is built in accordance with a reference algorithm, and said reference algorithm is different from said conjecture algorithm and is a multi-regression algorithm, a neural network algorithm, or a SVM algorithm; and said GSI model is used for computing respective GSI values for the set of process data, wherein said GSI model is built in accordance with a Mahalanobis distance algorithm;

fanning out said set of first VM models to said first AVM server and a second AVM server so as to conduct virtual metrology on the workpieces being produced on said first process apparatus and a second process apparatus, respectively;

performing a model-refreshing procedure on each set of first VM models in said first AVM server and said second AVM server; and providing VM services by said first AVM server and said second AVM server after completing their respective model-refreshing procedures.

17. The method as claimed in claim 16, wherein said model-refreshing procedure further comprises:

performing a retraining step for building a set of second VM models by using a set of process data and an actual measurement value newly collected to replace old data in said sets of historical process data and said historical measurement value, wherein model types and their building methods are the same for said set of first VM models and said set of second VM models; and replacing said set of first VM models by said set of second VM models to provide subsequent VM services.

18. The method as claimed in claim 16, further comprising:

applying said sets of historical process data and historical actual measurement values in accordance with a cross validation's leave-one-out (LOO) method, to rebuild said conjecture model, said reference prediction model and said GSI model, and to compute respective VM conjecture errors, reference prediction errors and GSI values for each of said sets of historical process data, thereby computing a refreshing threshold of VM conjecture, a refreshing threshold of reference prediction and a refreshing threshold of GSI;

inputting newly-collected process data to said conjecture model, said reference prediction model and said GSI model in said set of first VM models, thereby computing a phase-one VM value, a phase-one reference prediction value and a phase-one GSI value;

defining a workpiece and several consecutive workpieces entering said first process apparatus before or after said workpiece as a plurality of consecutive refreshing samples;

defining a first model-refreshing condition representing that the mean absolute percentage error (MAPE) values of the phase-one VM values of said consecutive refreshing samples are smaller than said refreshing threshold of VM conjecture;

defining a second model-refreshing condition representing that the MAPE values of the phase-one reference prediction values of said consecutive refreshing samples are smaller than said refreshing threshold of reference prediction;

defining a third model-refreshing condition representing that the phase-one GSI values of said consecutive refreshing samples are smaller than said refreshing threshold of GSI; and determining if all of said first model-refreshing condition, said second model-refreshing condition and said third model-refreshing condition are met simultaneously, thereby obtaining a determination result, wherein said model-refreshing procedure is completed when said determination result is true.

19. The method as claimed in claim 18, wherein the number of said consecutive refreshing samples is 3.

20. The method as claimed in claim 16, wherein said RI model is used for calculating an overlap area between a statistical distribution of a VM value and a statistical distribution of the corresponding reference prediction value, thereby generating the RI value of said VM value, wherein the RI value is higher when the overlap area is larger, representing that the reliance level of said VM value corresponding to the RI value is higher.

* * * * *